(12) United States Patent
Takahashi et al.

(10) Patent No.: US 10,601,852 B2
(45) Date of Patent: Mar. 24, 2020

(54) INFORMATION PROCESSING DEVICE, INFORMATION PROCESSING METHOD, AND RECORDING MEDIUM STORING PROGRAM

(71) Applicant: Panasonic Intellectual Property Corporation of America, Torrance, CA (US)

(72) Inventors: Ryota Takahashi, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/255,877

(22) Filed: Jan. 24, 2019

(65) Prior Publication Data

US 2019/0173902 A1    Jun. 6, 2019

Related U.S. Application Data

(63) Continuation of application No. PCT/JP2017/040727, filed on Nov. 13, 2017.
(Continued)

(30) Foreign Application Priority Data

Oct. 26, 2017    (JP) .................................. 2017-207085

(51) Int. Cl.
*H04L 29/06* (2006.01)
*G06F 21/55* (2013.01)
(Continued)

(52) U.S. Cl.
CPC .......... *H04L 63/1425* (2013.01); *G06F 21/55* (2013.01); *G06F 21/552* (2013.01);
(Continued)

(58) Field of Classification Search
None
See application file for complete search history.

(56) References Cited

U.S. PATENT DOCUMENTS 10,388,085 B2 *   8/2019   Harish .................... G01P 1/07
10,452,841 B1 *  10/2019   Tamersoy ............. G06F 21/552
(Continued)

FOREIGN PATENT DOCUMENTS

JP    2015-026252    2/2015
JP    2015-170121    9/2015

OTHER PUBLICATIONS

Hsiao, Ko-Jen et al. "Multicriteria Similarity-Based Anomaly Detection Using Pareto Depth Analysis." IEEE Transactions on Neural Networks and Learning Systems 27.6 (2016): 1307-1321. Crossref. Web. (Year: 2016).*

(Continued)

*Primary Examiner* — Jeffery L Williams
(74) *Attorney, Agent, or Firm* — Greenblum & Bernstein, P.L.C.

(57) ABSTRACT

Provided is an information processing device that includes a processor and has a capability to detect abnormalities on an in-vehicle network that may be caused by an attack. The processor receives input of data elements to be used as training data, normalizes the training data so as to be distributed within a first region, divides a multi-dimensional second region that encompasses the first region into third regions that are hypercubes of equal sizes, obtains S data elements that are contained by each of the third regions, and for each third region that includes a number of data elements that is less than a first threshold value T, adds noise elements that are vectors with a uniform distribution to the third regions, generates noise-added training data including the vectors in the second region, and generates and outputs (Continued)

Isolation Forest learning model data by using the generated noise-added training data.

13 Claims, 14 Drawing Sheets

Related U.S. Application Data

(60) Provisional application No. 62/430,570, filed on Dec. 6, 2016.

(51) Int. Cl.
| | |
|---|---|
| *G06K 9/62* | (2006.01) |
| *G07C 5/00* | (2006.01) |
| *H04L 29/08* | (2006.01) |
| *G06N 20/00* | (2019.01) |
| *H04L 12/40* | (2006.01) |
| *G06N 99/00* | (2019.01) |
| *G07C 9/00* | (2020.01) |

(52) U.S. Cl.
CPC ......... *G06F 21/554* (2013.01); *G06K 9/6232* (2013.01); *G06K 9/6262* (2013.01); *G06K 9/6282* (2013.01); *G06K 9/6284* (2013.01); *G06K 9/6298* (2013.01); *G06N 20/00* (2019.01); *G06N 99/00* (2013.01); *G07C 5/008* (2013.01); *H04L 12/40* (2013.01); *H04L 67/12* (2013.01); *G07C 2009/00555* (2013.01); *H04L 2012/40215* (2013.01)

(56) References Cited

U.S. PATENT DOCUMENTS

2015/0363551 A1* 12/2015 Cezar .................. G06F 17/18
   506/4
2019/0012460 A1* 1/2019 Hartnett ............... G06F 21/568
2019/0087737 A1* 3/2019 Pendar .................. G06N 20/00
2019/0170531 A1* 6/2019 Harish ............. G08G 1/096844
2019/0173902 A1* 6/2019 Takahashi ........... H04L 63/1425
2019/0301979 A1* 10/2019 Kawanoue ......... G05B 23/0254

OTHER PUBLICATIONS

Dietterich et al, Anomaly Detection: Principles, Benchmarking, Explanation, and Theory, Jul. 14, 2016, Oregon State University, p. 1-57. (Year: 2016).*

Goix, Nicolas and Drougard, Nicolas and Brault, Romain and Chiapino, Mael., "One Class Splitting Criteria for Random Forests", (2017), In: The 9th Asian Conference on Machine Learning, Nov. 15, 2017-Nov. 17, 2017 (Seoul, Korea, Republic Of). (Year: 2017).*

Sudipto Guha, Nina Mishra, Gourav Roy, and Okke Schrijvers. 2016. Robust random cut forest based anomaly detection on streams. In Proceedings of the 33rd International Conference on International Conference on Machine Learning—vol. 48 (ICML'16), vol. 48. JM (Year: 2016).*

International Search Report of PCT application No. PCT/JP2017/040727 dated Jan. 30, 2018.

Fei Tony Liu et al., "Isolation Forest", ICDM '08: Proceedings of the 2008 Eighth IEEE International Conference on Data Mining, IEEE Computer Society, Dec. 2008, pp. 413-422.

The Extended European Search Report dated Oct. 25, 2019 for the related European Patent Application No. 17877549.0.

Adel Ghazikhani et al: "Class imbalance handling using wrapper-based random oversampling", Electrical Engineering (ICEE), 2012 20th Iranian Conference on, IEEE, May 15, 2012 (May 15, 2012), pp. 611-616. XP032231730.

Hui Han et al: "Borderline-SMOTE: A New Over-Sampling Method in Imbalanced Data Sets Learning", Jan. 1, 2005 (Jan 1, 2005), Advances in Intelligent Computing : International Conference on Intelligent Computing, ICIC 2005, Hefei, China, Aug. 23-26, 2005; Proceedings, Springer, Berlin, DE, pp. 878-887, XP019017035.

Fei Tony Liu et al: "Isolation-Based Anomaly Detection", ACM Transactions on Knowledge Discovery From Data (TKDD), vol. 6, No. 1, Mar. 1, 2012 (Mar. 1, 2012), pp. 1-39, XP055567946.

* cited by examiner

INFORMATION PROCESSING DEVICE, INFORMATION PROCESSING METHOD, AND RECORDING MEDIUM STORING PROGRAM

BACKGROUND

1. Technical Field

The present disclosure relates to anomaly detection technology used in an in-vehicle network or the like.

2. Description of the Related Art

In-vehicle networks are more important than ever in highly computerized automobiles. A great number of electronic control units (ECUs) that control various types of systems are installed in an automobile. The ECUs are connected with each other by an in-vehicle network, and communication is made via this in-vehicle network to realize various function of the automobile. Controller Area Network (CAN) is one of several standards for such an in-vehicle network, and is employed in many countries and regions as a standard technology.

A network conforming to the CAN protocol can be constructed as a closed communication path in one automobile. However, it is not unusual to be installed with networks configured so as to be externally accessible. For example, an in-vehicle network may have a port to extract information flowing over the network for use in diagnosis of inboard systems, or have an automobile navigation system connected that has a function of providing a wireless local area network (LAN). Enabling external access to the in-vehicle network can improve convenience for the user, but also on the other hand increases threat as well.

For example, in 2013, it was verified that unauthorized vehicle control was possible by malicious use of parking assistance functions and so forth from outside of the in-vehicle network. Further, in 2015, it was verified that unauthorized control could remotely be formed regarding a particular model, and this verification led to a recall of this model. Such unauthorized control of vehicles by external access is a problem for the automotive industry that cannot be overlooked, and in the current situation there is urgent need for security measures for in-vehicle networks.

One technique for attacking an in-vehicle network is to externally access an ECU connected to the network and take over this ECU, and to transmit frames for attacking (hereinafter also referred to as attack frame) from this ECU to unauthorizedly control the automobile. An attack frame is an abnormal frame that differs with regard to some point from normal frames flowing over an in-vehicle network that is not under attack.

There has been disclosed technology to execute anomaly data detection processing with regard to frames flowing over a CAN bus (hereinafter referred to as CAN message, or simply message) using an evaluation mode obtained as the result of learning using learning data, as a technology for anomaly detection on such an in-vehicle network (see Japanese Unexamined Patent Application Publication Nos. 2015-026252 and 2015-170121).

SUMMARY

Research on attacks on in-vehicle networks, and security technology to counter attacks, is still far from complete. The technologies in Japanese Unexamined Patent Application Publication Nos. 2015-026252 and 2015-170121 are not sufficient, and further research and development is desired.

One non-limiting and exemplary embodiment provides an information processing device and so forth, useful in detecting abnormalities from attacks on an in-vehicle network of a vehicle such as an automobile or the like.

In one general aspect, the techniques disclosed here feature an information processing device that includes a processor and a memory, the memory including at least one set of instructions that, when executed by the processor, causes the processor to execute operations including obtaining training data for an Isolation Forest algorithm, the training data including N data elements, N being an integer that is greater than two, and each of the N data elements being an M-dimensional vector, M being an integer that is greater than or equal to two, normalizing the training data so as to be distributed within an M-dimensional first region, dividing a second region into LM third regions of equal sizes, L being an integer that is greater than or equal to four, and the second region being an M-dimensional region that is larger than the first region and encompasses the first region, each of the LM third regions being an M-dimensional hypercube, obtaining S data elements included in each of the LM third regions, S being an integer that is greater than or equal to zero, adding, to each of one or more third regions from among the LM third regions within which a value of S is less than a first threshold value T, T being an integer that is greater than or equal to one, D first noise elements in a uniform distribution, D being equal to a difference between T and S, and each of the D first noise elements being an M-dimensional vector, generating noise-added training data that includes each of the N data elements and each of the D first noise elements, and generating and outputting Isolation Forest learning model data by using the noise-added training data.

According to the present disclosure, an information processing device and so forth are provided, used in detecting abnormalities from attacks on an in-vehicle network of a vehicle such as an automobile or the like, in which a learning model with suppressed erroneous detection rate is quickly provided.

It should be noted that these general or specific embodiments may be implemented as a system, a device, a method, an integrated circuit, a computer program, or a computer-readable non-transitory recording medium such as a CD-ROM, and may be realized by any combination of a system, device, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
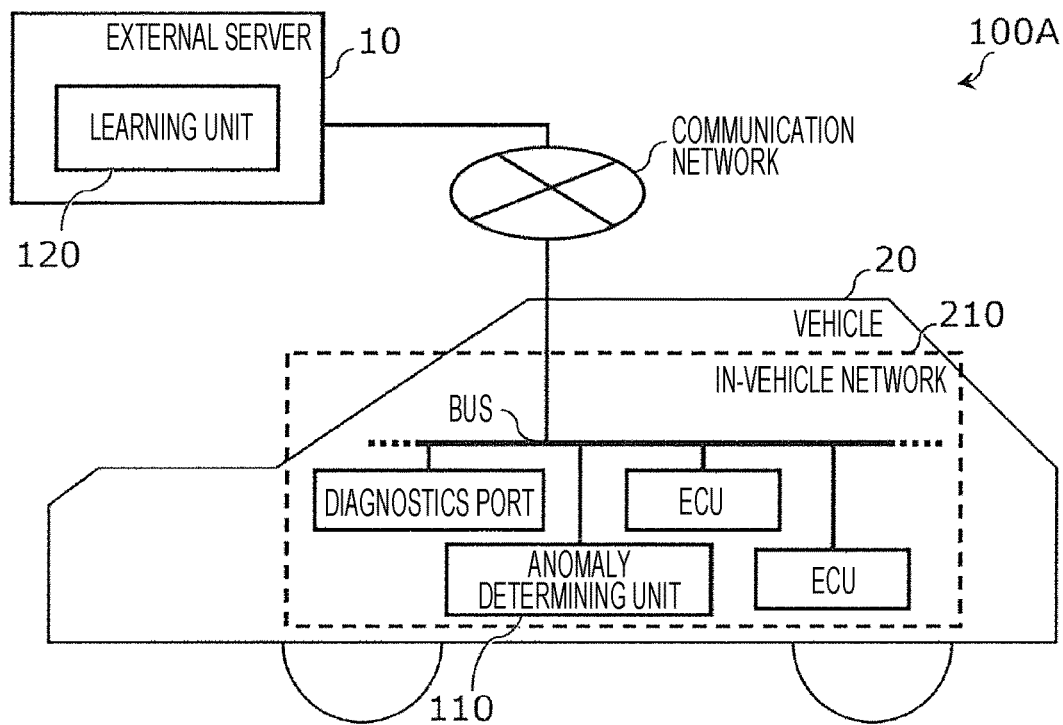
FIG. 1A is a block diagram illustrating a configuration example of an anomaly detection system including an information processing device according to a first embodiment.

Underlying Knowledge Forming Basis of the Present Disclosure

Techniques proposed as security measures for in-vehicle networks can be generally categorized into two. One is to use encryption of messages or authentication of a transmitting source. Although this technology is theoretically effective, there are parts where change in implementation of ECUs is necessary, and there are cases where the number of ECUs installed in one automobile exceeds several hundred, so widespread use at an early stage is difficult.

Another is to monitor CAN messages flowing over the in-vehicle network. This technique can be realized by adding a monitoring ECU (node) to each automobile, and introduction is relatively easy. Such proposed techniques can further be generally classified into rule-based techniques, techniques using transmission cycles of data, and techniques of detecting outlier values in the contents of messages using the local outlier factor (LOF) algorithm.

Of these three types of techniques, rule-based techniques and techniques using transmission cycles of data can handle known attack patterns, but in order to detect unknown attack patterns, detection based on the contents of message, such as in the technique using the LOF, is necessary. Note however, in the technique using the LOF, there is a need to store a great amount of normal data for evaluation of CAN messages, and the required amount of calculation is great. However, ECUs connected to an in-vehicle network do not necessarily have plentiful data processing capabilities or storage region capacity, no technique is practical unless it can detect at a speed required for an automobile traveling on a road at a speed of several tens of kilometers per hour even in such an operating environment.

Accordingly, the present inventors conceived using an anomaly detection algorithm called Isolation Forest or iForest (see NPL 1) where data required to be stored is smaller than LOF and the calculation amount is less, as a technique for anomaly detection on an in-vehicle network. The present inventors further propose a technology that enables execution of anomaly detection at a necessary speed and maximal accuracy, even in a case where usage of Isolation Forest is executed with restricted calculator resources.

An information processing device according to an aspect of the present disclosure is an information processing device that includes a processor and a memory, the memory including at least one set of instructions that, when executed by the processor, causes the processor to execute operations including obtaining training data for an Isolation Forest algorithm, the training data including N data elements, N being an integer that is greater than or equal to two, and each of the N data elements being an M-dimensional vector, M, being an integer that is greater than or equal to two, normalizing the training data so as to be distributed within an M-dimensional first region, dividing a second region into LM third regions of equal sizes, L being an integer that is greater than or equal to four, and the second region being an M-dimensional region that is larger than the first region and encompasses the first region, each of the LM third regions being an M-dimensional hypercube, obtaining S data elements included in each of the LM third regions, S being an integer that is greater than or equal to zero, adding, to each of one or more third regions from among the LM third regions within which a value of S is less than a first threshold value T, T being an integer that is greater than or equal to one, D first noise elements in a uniform distribution, D being equal to a difference between T and S (i.e., D=T−S), and each of the D first noise elements being an M-dimensional vector, generating noise-added training data that includes each of the N data elements and each of the D first noise elements, and generating and outputting Isolation Forest learning model data by using the noise-added training data.

Accordingly, a learning model that enables execution of Isolation Forest with a lower rate of erroneous detection can be obtained.

Also, for example, the operations may further include determining whether or not N is greater than or equal to a predetermined second threshold value, and executing, when N is determined not to be greater than or equal to the predetermined second threshold value, the dividing and the adding, and thereafter executing the generating the noise-added training data and the generating and outputting the Isolation Forest learning model data.

Accordingly, in a case where the count of data elements of the training data is excessively large with regard to the load state of the processor, for example, generating of the learning model using this training data can be delayed.

Also, for example, the operations may further include adding, when N is determined to be greater than or equal to the predetermined second threshold value, K second noise elements with a uniform distribution within the second region, K being a natural number that is greater than or equal to zero and less than N, each of the K second noise elements being an M-dimensional vector, and the generating and outputting the Isolation Forest learning model data may be executed after executing the adding of the second noise elements.

Accordingly, the method of adding noise can be switched in accordance with the processing load that changes according to the size of the training data, and a learning model can be generated at a speed appropriate for the execution environment.

Also, for example, the operations may further include, when N is determined not to be greater than or equal to the predetermined second threshold value, obtaining data for testing for the Isolation Forest algorithm, and determining whether or not N is greater than or equal to a predetermined third threshold value. The operations may further include, when N is determined not to be greater than or equal to the predetermined third threshold value, executing a set of operations that includes the dividing, the adding, the generating the noise-added training data, and the generating the Isolation Forest learning model data, a plurality of times using L different values, and outputting a respective set of learning model data for each executed set of operations, executing an anomaly detection operation on the data for testing using each respective set of learning model data, evaluating each respective set of learning model data based on a result of executing the anomaly detection operation, selecting a best set of learning model data from among the sets of learning model data based on a result of the evaluating, and when N is determined to be greater than or equal to the predetermined third threshold value, executing the set of operations one time in the dividing, using L of a predetermined value.

Accordingly, whether to generate multiple learning model data in accordance with the processing load that changes according to the size of the training data and output the best one, or to generate and output one learning model data, can be switched between. Thus, a learning model can be generated at a speed appropriate for the execution environment.

Also, for example, the operations may further include determining, when N is determined not to be greater than or equal to the predetermined third threshold value, a number of different values of L, so as to have a negative correlation with the value of N.

Accordingly, if the training data is large, reducing the count of divisions into third regions reduces the processing load. Thus, a learning model can be generated at a speed appropriate for the execution environment.

Also, for example, the operations may further include determining a value of the first threshold value T as being equal to any number that is less than a median value of numbers of data elements included in each of the third regions within the first region.

Accordingly, if the training data is large, reducing the count of third regions to which noise elements are added enables increase in the processing load to be suppressed. Thus, a learning model can be generated at a speed appropriate for the execution environment.

Also, for example, the operations may further include, when N is determined to be greater than or equal to the predetermined second threshold value, obtaining data for testing for the Isolation Forest algorithm, and determining whether or not N is greater than or equal to a predetermined fourth threshold value. The operations may further include, when N is determined not to be greater than or equal to the predetermined fourth threshold value, executing a set of operations that includes the adding the K second noise elements, the generating the noise-added training data, and the generating the Isolation Forest learning model data, a plurality of times using K different values, and outputting a respective set of learning model data for each executed set of operations, executing an anomaly detection operation on the data for testing using each respective set of learning model data, evaluating each of the plurality of learning model data, and selecting a best set of learning model data from among the sets of learning model data based on a result of the evaluating, and when N is determined to be greater than or equal to the predetermined fourth threshold value, executing the set of operations one time using K of a predetermined value.

Accordingly, whether to generate multiple learning model data in accordance with the processing load that changes according to the size of the training data and output the best one, or to generate and output one learning model data, can be switched between. Thus, a learning model can be generated at a speed appropriate for the execution environment.

Also, for example, the operations may further include determining, when N is determined not to be greater than or equal to the predetermined fourth threshold value, a number of different values of K, so as to have a negative correlation with the value of N.

Accordingly, increase in the processing load can be suppressed by reducing the count of learning models to be generated. Thus, a learning model can be generated at a speed appropriate for the execution environment.

Also, for example, the first region being defined by a hypercube of $[0, 1]^M$ in an M-dimensional space, the second region may be a region defined by a hypercube of $[-0.5, 1.5]^M$ in the space.

Accordingly, even in a case where there are few outlier values in training data usable for generating a learning model, a learning model can be obtained that enables anomaly detection with a lower rate of erroneous detection.

Also, an anomaly detection system according to an aspect of the present disclosure includes an information processing device connected to a network, and an anomaly detection device connected to the network. The information processing device includes a first processor, and a first memory including at least one set of instructions that, when executed by the first processor, causes the first processor to execute first operations including obtaining training data for an Isolation Forest algorithm, the training data including N data elements, N being an integer that is greater than or equal to two, and each of the N data elements being an M-dimensional vector, M being an integer that is greater than or equal to two, normalizing the training data so as to be distributed within an M-dimensional first region, dividing a second region into LM third regions of equal sizes, L being an integer that is greater than or equal to four, and the second region being an M-dimensional region that is larger than the first region and encompasses the first region, each of the LM third regions being an M-dimensional hypercube, obtaining S data elements included in each of the LM third regions, S being an integer that is greater than or equal to zero, adding, to each of one or more third regions from among the LM third regions within which a value of S is less than a first threshold value T, T being an integer that is greater than or equal to one, D first noise elements in a uniform distribution, D being equal to a difference between T and S, and each of the D first noise elements being an M-dimensional vector, generating noise-added training data that includes each of the N data elements and each of the D first noise elements, and generating and outputting Isolation Forest learning model data by using the noise-added training data. The anomaly detection device includes a second processor, a second memory that stores the learning model data output from the information processing device, and a third memory that includes at least one set of second instructions that, when executed by the second processor causes the second processor to execute second operations including obtaining data that flows through the network, and executing an anomaly detection operation of the obtained data based on the learning model data stored in the second memory.

Accordingly, anomaly detection can be executed using a learning model that is speedily updated taking accuracy into consideration.

Also, an information processing method according to an aspect of the present disclosure is an information processing method including: obtaining training data for an Isolation Forest algorithm, the training data including N data elements, N being an integer that is greater than or equal to two, and each of the N data elements being an M-dimensional vector, M being an integer that is greater than or equal to two; normalizing the training data so as to be distributed within an M-dimensional first region; dividing a second region into LM third regions of equal sizes, L being an integer that is greater than or equal to four, and the second region being an M-dimensional region that is larger than the first region and encompasses the first region, each of the LM third regions being an M-dimensional hypercube; obtaining S data elements included in each of the LM third regions, S being an integer that is greater than or equal to zero; adding, to each of one or more third regions from among the LM third regions within which a value of S is less than a first threshold value T, T being an integer that is greater than or equal to one, D first noise elements in a uniform distribution, D being equal to a difference between T and S, and each of the D first noise elements being an M-dimensional vector; generating noise-added training data that includes each of the N data elements and each of the D first noise elements; and generating and outputting Isolation Forest learning model data by using the noise-added training data.

A computer-readable non-transitory recording medium according to an aspect of the present disclosure stores a program for an information processing device having a processor. When executed by the processor, the program causes the processor to implement a method including obtaining training data for an Isolation Forest algorithm, the training data including N data elements, N being an integer that is greater than or equal to two, and each of the N data elements being an M-dimensional vector, M being an integer that is greater than or equal to two, normalizing the training data so as to be distributed within an M-dimensional first region, dividing a second region into LM third regions of equal sizes, L being an integer that is greater than or equal to four, and the second region being an M-dimensional region that is larger than the first region and encompasses the first region, each of the LM third regions being an M-dimensional hypercube, obtaining S data elements included in each of the LM third regions, S being an integer that is greater than or equal to zero, adding, to each of one or more third regions from among the LM third regions within which a value of S is less than a first threshold value T, T being an integer that is greater than or equal to one, D first noise elements in a uniform distribution, D being equal to a difference between T and S, and each of the D first noise elements being an M-dimensional vector, generating noise-added training data that includes each of the N data elements and each of the D first noise elements, and generating and outputting Isolation Forest learning model data by using the noise-added training data.

Such a method and program also enable a learning model that enables execution of Isolation Forest with a lower rate of erroneous detection to be obtained.

It should be noted that these general or specific embodiments may be implemented as a system, a method, an integrated circuit, a computer program, or a computer-readable recording medium such as a CD-ROM, and may be realized by any combination of a system, method, integrated circuit, computer program, and recording medium.

An information processing device, information processing method, and so forth, according to embodiments, will be described below in detail with reference to the drawings. Note that the embodiments described below are all specific examples of the present disclosure. Accordingly, values, components, placements and connected states of components, steps (processes), the order of steps, and so forth, illustrated in the following embodiments, are only exemplary, and do not restrict the present disclosure.

Components in the following embodiments which are not included in an independent Claim are described as being optionally includable components. The drawings are schematic drawings, and are not necessarily strict illustrations.

Description regarding CAN and Isolation Forest included below is intended to assist comprehension of the present disclosure, and items in the description not included in a Claim have not been described intending restricting the present disclosure.

First Embodiment

Configuration

Overview

Figure 1B:
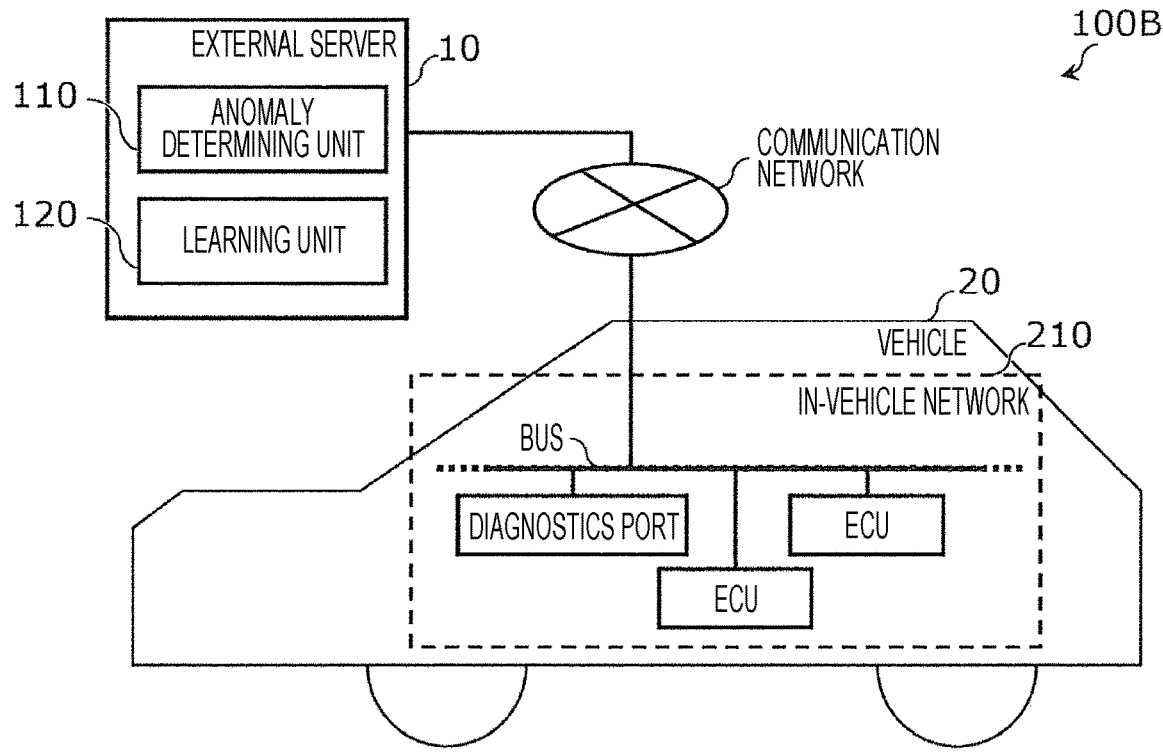
FIG. 1B is a block diagram illustrating a configuration example of an anomaly detection system including the information processing device according to the first embodiment.
Figure 1C:
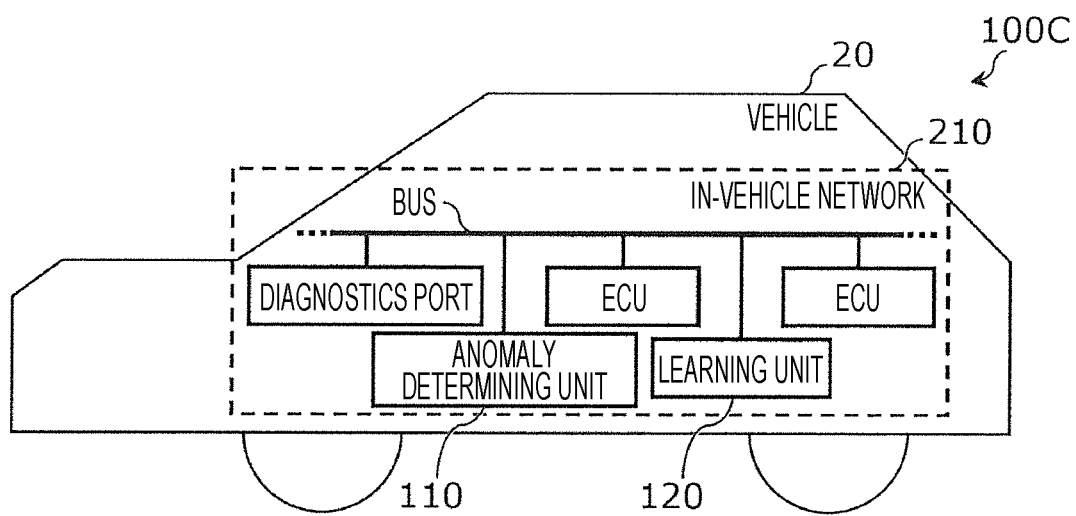
FIG. 1C is a block diagram illustrating a configuration example of an anomaly detection system including the information processing device according to the first embodiment.

FIGS. 1A through 1C are block diagrams illustrating configuration examples of anomaly detection systems each including an information processing device according to a first embodiment. Anomaly detection systems 100A, 100B, and 100C, each having different configurations, are illustrated in FIGS. 1A through 1C, respectively.

The anomaly detection system 100A through 100C are systems that detect anomalies in data flowing over a network that is the object of monitoring, using an algorithm called Isolation Forest. Each has an anomaly determining unit 110 and learning unit 120.

The anomaly determining unit 110 determines whether data flowing over an in-vehicle network 210 that a vehicle 20 has is anomalous or normal. The vehicle 20 is an automobile, for example. The in-vehicle network 210 is a network corresponding to the CAN standard for example, and includes a bus, multiple ECUs connected to this bus, and a diagnostics port, in the configuration examples in FIGS. 1A through 1C. The multiple ECUs include ECUs with differing functions, such as ECUs that collect and analyze measurement data from various types of sensors, ECUs that control the engine, an ECU that controls the brakes, an ECU that monitors the network, and so forth. Data flowing over the in-vehicle network 210 is data of messages flowing over the bus.

The learning unit 120 performs preliminary learning, for the anomaly determining unit 110 to make the aforementioned determination. More specifically, the learning unit 120 generates a learning model for the anomaly determining unit 110 to use in determination, by learning using training data. Data of the generated learning model (hereinafter, also referred to as learning model data) is stored in a storage device (omitted from illustration), for example.

The anomaly determining unit 110 reads in the learning model from the storage device, and determines whether unknown data that is the object of determination of whether normal or anomalous, i.e., data of a message obtained from the in-vehicle network 210, is deviated in light of this learning model. In further detail, the learning model that the learning unit 120 generates is made up of multiple binary trees, with the anomaly determining unit 110 determining whether data is anomalous or not using the average value of scores calculated from the multiple binary trees. Note that a binary tree used in Isolation Forest is referred to as an Isolation Tree or iTree.

The anomaly determining unit 110 and learning unit 120 are functional components provided by a processor that reads in and executes a predetermined program. The location where the processor that provides the functional components of the processor is situated differs amount the configuration examples in FIGS. 1A through 1C.

In the configuration example illustrated in FIG. 1A, the learning unit 120 is provided by a processor and memory of an external server 10 that is a so-called server computer, outside of the vehicle 20. The external server 10 is an example of the information processing device according to the present embodiment.

In this case, the learning unit 120 obtains messages flowing over the in-vehicle network 210 as training data, from the vehicle 20 via a communication network, for example. The learning unit 120 also outputs an Isolation Forest learning model data generated using this training data, and provides this to the anomaly determining unit 110 of the vehicle 20 via the communication network.

At the vehicle 20, the learning model data is stored in a storage device such as flash memory or the like of a microcontroller of a monitoring ECU that is connected to the in-vehicle network 210 for monitoring the network, for example, and the anomaly determining unit 110 is provided by the processor of this microcontroller. The anomaly determining unit 110 executes anomalous determination of messages using the learning model data regarding which learning model data has been obtained from this storage device, on messages obtained from the bus. Note that in such a configuration, a learning model updated after the vehicle 20 has shipped can be provided to the anomaly determining unit 110.

In the configuration example illustrated in FIG. 1B, both the anomaly determining unit 110 and learning unit 120 are provided by the processor and memory of the external server 10 outside of the vehicle 20. This external server 10 also is an example of the information processing device according to the present embodiment.

In this case as well, the learning unit 120 obtains messages flowing over the in-vehicle network 210 as training data, from the vehicle 20 via a communication network, for example. The learning unit 120 also outputs an Isolation Forest learning model data generated using this training data, but the output destination is not stored outside of the external server 10 but in a storage device (omitted from illustration) such as a hard disk drive or the like that the external server 10 has, for example.

In this configuration, anomaly determination is performed not in the vehicle 20 but in the external server 10. That is to say, messages flowing over the in-vehicle network 210 are transmitted to the external server 10 via the communication network. The messages received by the external server 10 are input to the anomaly determining unit 110. The anomaly determining unit 110 obtains learning model data from the storage device, executes anomaly determination of messages using this learning model data, and transmits the results to the vehicle 20 via the communication network. Note that in such a configuration, the learning model data that the anomaly determining unit 110 uses in the external server 10 is continually updated.

In the configuration example illustrated in FIG. 1C, both the anomaly determining unit 110 and learning unit 120 are provided by a microcontroller of the monitoring ECU that is connected to the in-vehicle network 210 of the vehicle 20 and monitors the in-vehicle network 210. This monitoring ECU is one of examples of the information processing device according to the present embodiment.

In this case, the learning unit 120 directly obtains and uses messages flowing over the in-vehicle network 210 as training data, for example. The learning unit 120 also outputs Isolation Forest learning model data generated using this training data, but the output destination is not outside of the vehicle 20, but rather is stored in a storage device in the vehicle 20, e.g., in a storage device such as flash memory within the monitoring ECU.

In this configuration, generating of the learning model and anomaly determination are both performed in the vehicle 20. For example, at the monitoring ECU, the learning unit 120 obtains data of messages flowing over the in-vehicle network 210 to which the monitoring ECU is connected, as training data, and generates a learning model. The data of the generated learning model is stored in the storage device of the monitoring ECU. At the monitoring ECU, the anomaly determining unit 110 further obtains the learning model data from the storage device, and executes anomaly determination of messages using this learning model data. In this configuration as well, the learning model data in the vehicle 20 that the anomaly determining unit 110 uses can be updated.

Note that the configurations illustrated in FIGS. 1A through 1C are not fixed configurations of the vehicle 20 after shipping, and may be configurations that are dynamically changeable in the vehicle 20. For example, switching among these configurations may be performed in accordance with communication speed between the vehicle 20 and external server 10, the usage rate of calculator resources of the monitoring ECU, the remaining charge in a case where the vehicle 20 is an electric vehicle, or operations of the driver.

Configuration of Anomaly Determining Unit and Learning Unit

The configuration of the anomaly determining unit 110 and learning unit 120 that are components of the anomaly detection systems 100A, 100B, and 100C described in the overview of the configuration will be described. Note that hereinafter, the anomaly detection systems 100A, 100B, and 100C will be referred to as anomaly detection system 100, without specifying which one, or all collectively.

Figure 2:
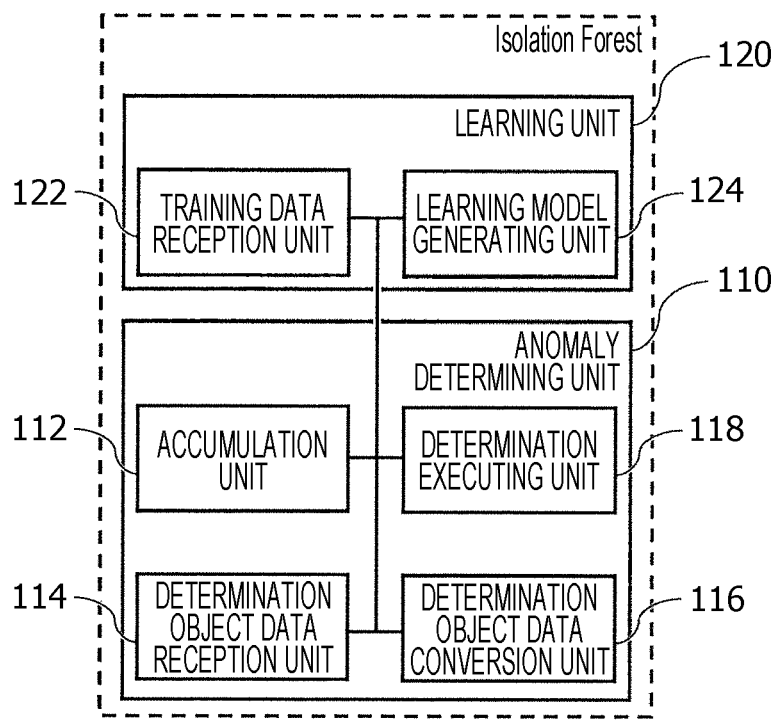
FIG. 2 is a block diagram illustrating a configuration example of an anomaly determining unit and learning unit making up the anomaly detection system.

FIG. 2 is a block diagram illustrating a configuration example of the anomaly determining unit 110 and learning unit 120 making up the anomaly detection system 100. The learning unit 120 has a training data reception unit 122 and a learning model generating unit 124, as illustrated in FIG. 2.

The training data reception unit 122 accepts input of training data. The training data here is two or more m-dimensional vectors, where M is an integer of 2 or greater. The values of each dimension are the values of each byte from the start of the payload of the CAN message, which is up to 8 bytes maximum, for example. The learning unit 120 generates learning model data using the training data that the training data reception unit 122 has received input of, and outputs this learning model data to an accumulation unit 112 of the anomaly determining unit 110 which will be described later.

Figure 3:
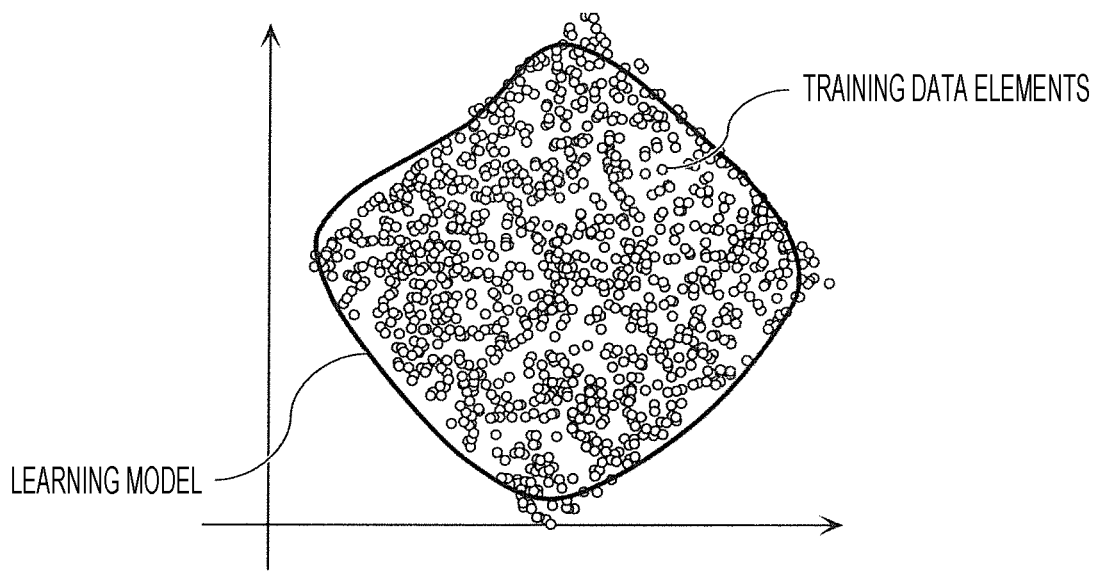
FIG. 3 is a schematic diagram for describing a learning model generated by the learning unit using training data.

FIG. 3 is a schematic diagram for describing data elements of training data in a case where M=2, and a learning model generated using the training data. In FIG. 3, the data elements are a point group distributed in M-dimensional space and are indicated by unfilled circles, and the learning model is represented by a heavy solid line at a boundary in the M-dimensional space. This boundary will also be referred to as a determination boundary hereinafter. Note that in a case of M=2, the determination boundary is a boundary line.

The anomaly determining unit 110 includes the accumulation unit 112, a determination object data reception unit 114, a determination object data conversion unit 116, and a determination executing unit 118, as further illustrated in FIG. 2.

The accumulation unit 112 saves the learning model data output from the learning unit 120, as described above. Data used for conversion of determination object data, which will be described later, is also saved in the accumulation unit 112.

The determination object data reception unit 114 obtains data that is the object of anomaly determination, i.e., a CAN message, from the in-vehicle network 210. The determination object data conversion unit 116 convers CAN messages received by the determination object data reception unit 114 into a format to be processed at the determination executing unit 118. Extraction of determination object portions from the CAN message, normalization of the determination object data using conversion data described above, and so forth, are performed in this conversion, for example. Normalization will be described later.

The determination executing unit 118 executes determination of whether or not the determination object data is normal or anomalous, based on the learning model saved in the accumulation unit 112 as learning model data, i.e., performs anomaly determination.

Figure 4:
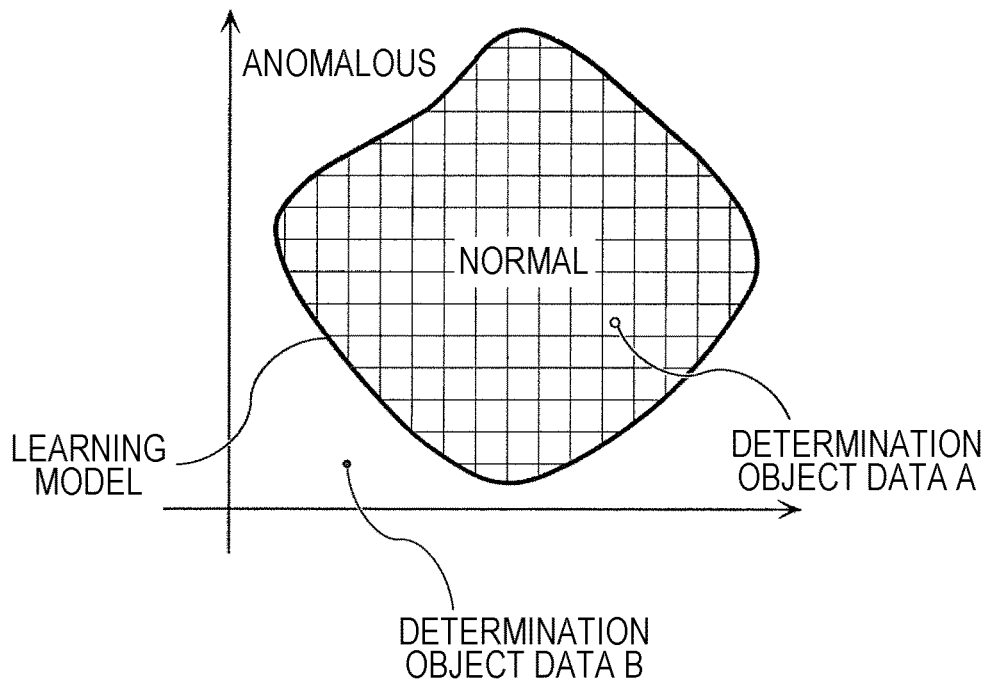
FIG. 4 is a schematic diagram for describing anomaly determination by the anomaly determining unit

FIG. 4 is a schematic diagram illustrating this anomaly determination. In FIG. 4, two sets of data, determination object data A and determination object data B, are displayed in M-dimensional space based on the values thereof.

The determination executing unit 118 determines whether each data is normal or anomalous, based on whether each data is positioned on the inner side of the determination boundary of the learning model or on the outside, and outputs the results thereof. In this example, the determination object data A situated on the inner side of the determination boundary is demeaned to be normal, and the determination object data B situated on the outer side of the determination boundary is determined to be anomalous. In a case where a determination is made of an anomaly, at the monitoring ECU including the anomaly determining unit 110 and learning unit, another program that takes this determination result as input is executed and outputs an error message to the bus, a command is transmitted to cause part of all of the functions of other ECUs to be restricted or to cause the other ECUs to transmission to a special operation mode to deal with an abnormality, or the like, for example. Notification of an abnormality may be given to the driver of the vehicle 20, by display at the meter panel or by audio. Other than this, information relating to the occurrence of an abnormality may be recorded in a log. This log can be obtained by a mechanic or the like working on the vehicle 20 via the diagnostics port included in the in-vehicle network 210, and used, for example.

The components of the anomaly determining unit 110 and learning unit 120 execute part of the Isolation Forest algorithm, and cooperatively execute the entire Isolation Forest algorithm as described above.

Overview of Processing in Anomaly Detection System

Figure 5:
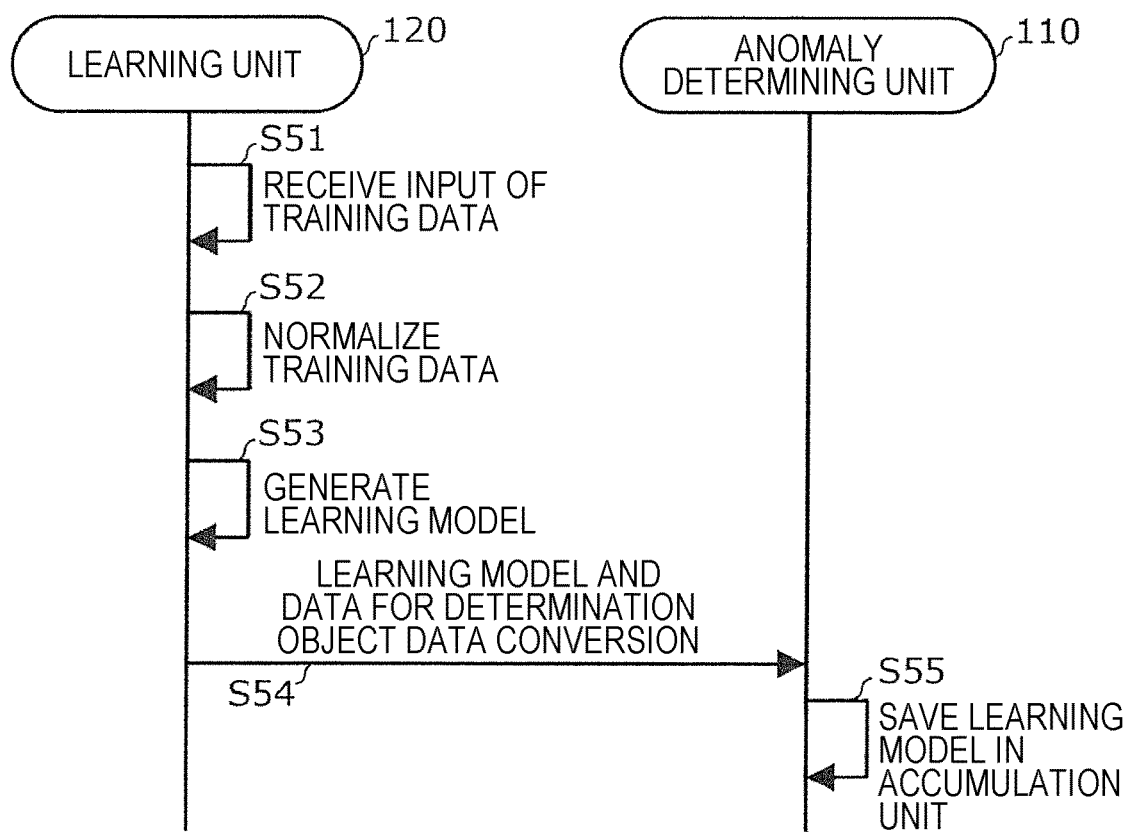
FIG. 5 is a diagram illustrating the flow of data at the learning unit that generates the learning model.
Figure 6:
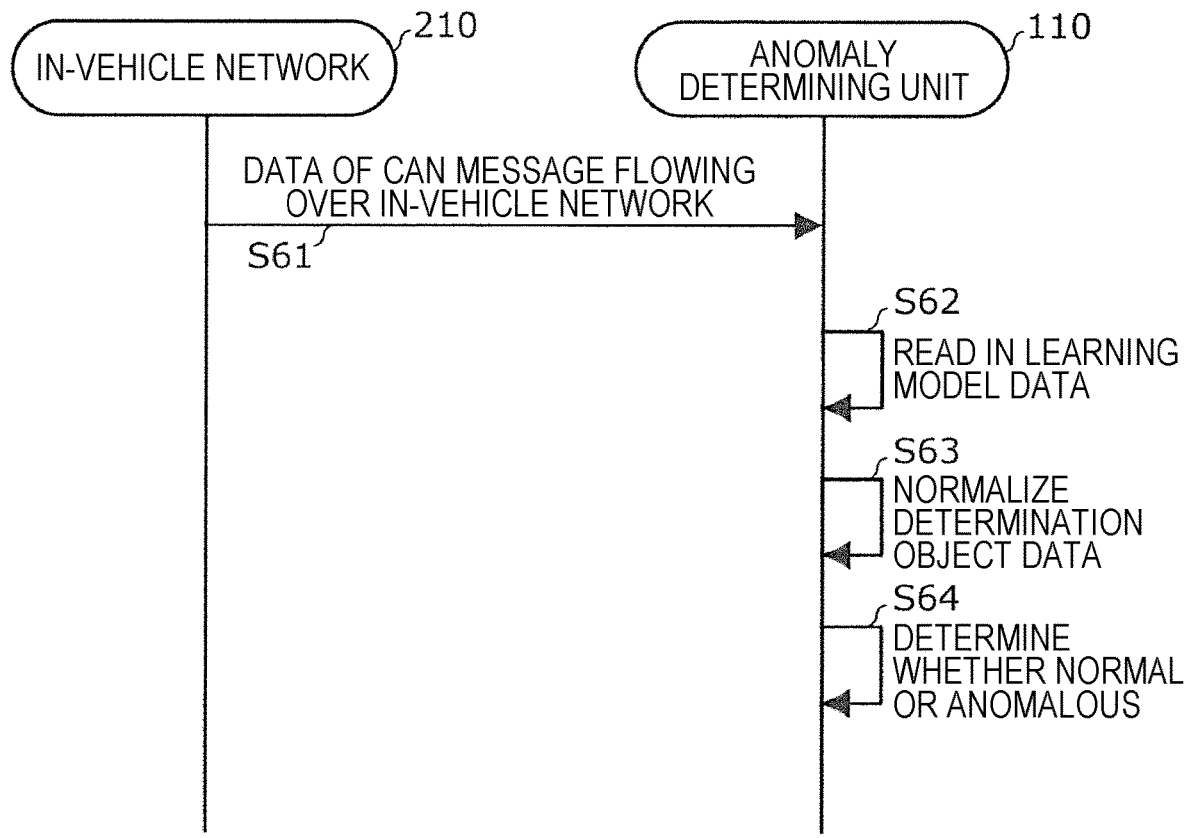
FIG. 6 is a diagram illustrating the flow of data at the anomaly determining unit performing anomaly determination.

FIGS. 5 and 6 illustrate the flow of data at the anomaly determining unit 110 and learning unit 120 having the above-described components. FIG. 5 is a diagram illustrating the flow of data at the learning unit 120 that generates the learning model. FIG. 6 is a diagram illustrating the flow of data at the anomaly determining unit 110 that performs anomaly determination. Note that these diagrams are expressed in a form also serving as flowcharts indicating the order of processing at each part, based on sequence diagrams illustrating the flow of data.

As illustrated in FIG. 5, first, the training data reception unit 122 receives input and training data is obtained, in the learning unit 120 that generates the learning model (step S51). The input source of the training data is, if executing generating of the learning model before shipping the vehicle 20, at a location within a storage device specified by a person or set beforehand, at this stage, for example. If executing generating of the learning model is after shipping the vehicle 20, the input source of the training data is the in-vehicle network 210 to which the monitoring ECU including the learning unit 120 is connected, for example.

Next, at the learning unit 120, the learning model generating unit 124 normalizes the input training data (step S52), and uses the normalized training data to generate a learning model by a technique according to Isolation Forest (step S53). Note that normalization is calculation processing to convert the original distribution range of input training data in the M-dimensional space, so that the distribution range covers within a predetermined region in the same space, while maintaining the relative positional relation of each training data.

The data of the generated learning model is handed to the anomaly determining unit 110 (step S54), and at the anomaly determining unit 110 the learning model is saved in the accumulation unit 112 (step S55). The data used for the normalization calculation processing described above is also handed from the learning unit 120 to the anomaly determining unit 110 along with learning model data. This data includes the maximum value and minimum value and so forth of each component of feature vectors necessary for conversion. The anomaly determining unit 110 executes normalization of unknown data that is the object of determination, using this data.

Also, as illustrated in FIG. 6, first, the determination object data reception unit 114 of the anomaly determining unit 110 that performs anomaly determination obtains data of the CAN message for the in-vehicle network 210, that is the object of anomaly determination (step S61).

Next, at the anomaly determining unit 110, the determination executing unit 118 reads in learning model data saved in the accumulation unit 112 (step S62). The determination object data conversion unit 116 reads in data such as coefficients and so forth used for normalization of the training data from the accumulation unit 112, and normalizes the data of the determination object data, i.e., the data of the obtained CAN message, using this data (step S63). The determination executing unit 118 determines whether the normalized data is normal or anomalous, based on the learning model data (step S64).

This so far is the overview of anomaly determination processing that is executed at the anomaly detection system 100, including processes from generating a learning model using training data, up to anomaly determination using the learning model. Using the Isolation Forest technique for this anomaly determination reduces the load on calculator resources as compared with conventional arrangements, and processing can be executed at higher speeds.

Figure 7:
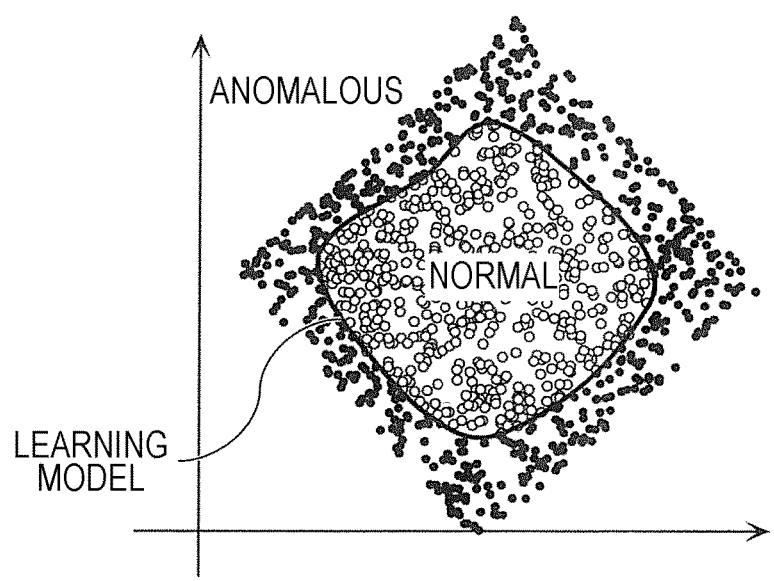
FIG. 7 is a diagram illustrating an example of an inappropriate determination boundary not fitting a training data distribution.

However, there are cases with the Isolation Forest algorithm where the determination boundary of the learning model obtained as the result of learning does not appropriately fit the distribution of normal training data in the M-dimensional space. FIG. 7 is an example of such an inappropriate determination boundary. In a case where the determination boundary is on the inner side from the outer edge of the distribution of normal data elements, erroneous determination will be made in the anomaly determination that this is anomalous, even though it actually is normal. In the example in FIG. 7, the data elements indicated by the circles that are filled in solid are data elements that are determined to be anomalous data, but actually many data elements that are normal are contained therein. Hereinafter, erroneous detection by erroneous determination that normal data is anomalous will also be referred to as false positive.

A learning model that is the cause of false positive can occur in a case where the amount of anomalous data included in the training data is insufficient, for example. Description will be made below regarding processing performed at the anomaly detection system 100 to obtain an appropriate learning model even in such cases.

Processing to Obtain Appropriate Learning Model

Two examples of processing methods in the present embodiment to obtain an appropriate learning model will be described below.

First Processing Method

Figure 8:
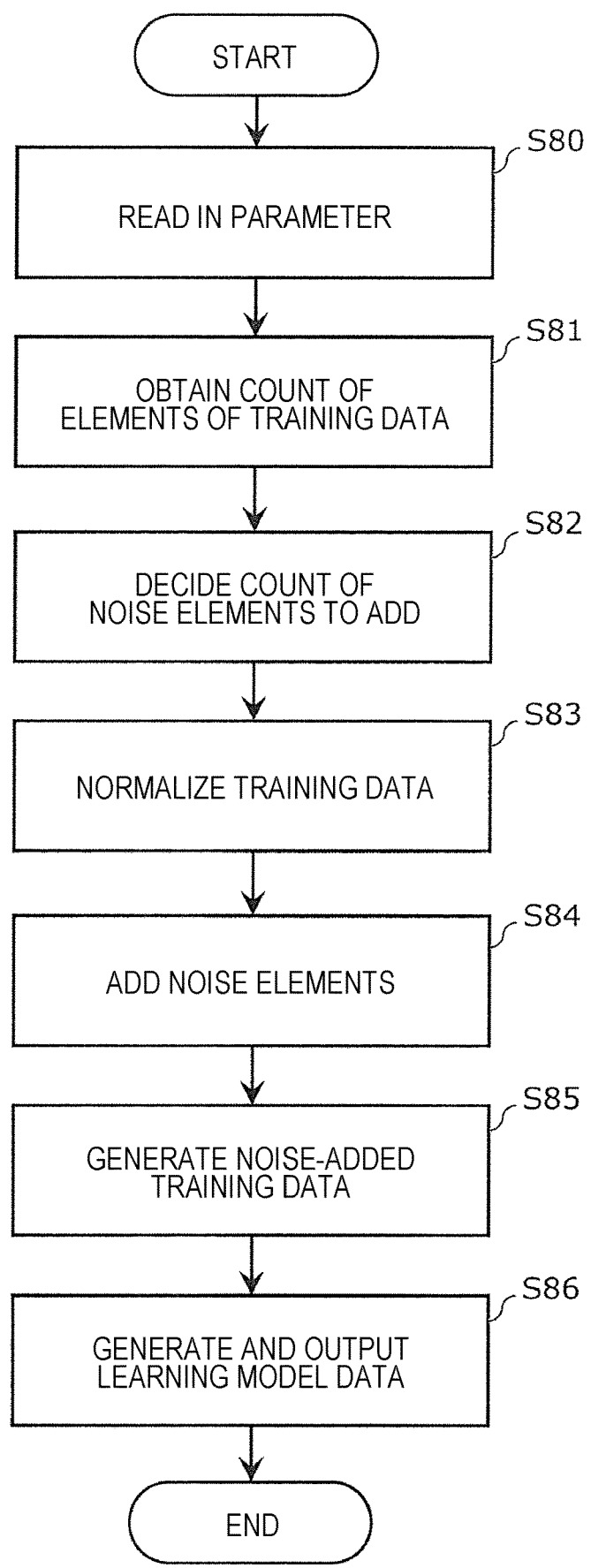
FIG. 8 is a flowchart illustrating an example of a training data processing method, executed in the anomaly detection system to obtain an appropriate learning model.
Figure 9A:
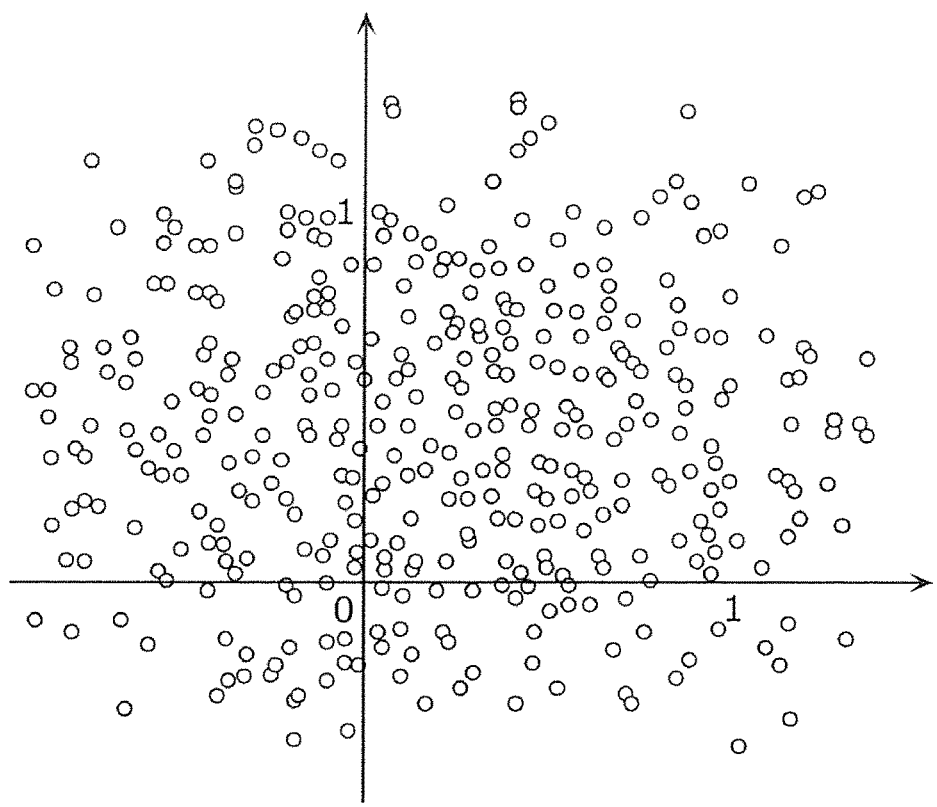
FIG. 9A is a diagram illustrating an example of training data distributed in M-dimensional space, before normalization.

FIG. 8 is a flowchart illustrating a first processing method that is an example of a training data processing method to obtain the appropriate learning model described above. The first processing method is executed by the learning model generating unit 124, in the learning unit 120 after having received input of Isolation Forest training data made up of two or more M-dimensional vectors. Note that in the following, processing by the learning model generating unit 124 may be described as processing of the learning unit 120. FIG. 9A is an example of an initial state of input training data that is distributed in M-dimensional space in a case where M=2, i.e., in a two-dimensional space.

First, the learning unit 120 reads in a parameter used for this processing (step S80). Details of the parameter will be described in a subsequent step.

Next, the learning unit 120 obtains the count of data elements in the input training data (step S81).

The learning unit 120 then decides the count of noise elements to add to the training data, based on the count of data elements (step S82). The noise elements also are M-dimensional vectors. The parameter obtained in step S80 is used to decide the count of noise elements in step S82, and is a rea number, larger than 0 and smaller than 1, for example. A value where the count of data elements obtained in step S81 has been multiple by this parameter is rounded down to an integer, is used as the count of noise elements added to the training data. That is to say, the count of noise elements is decoded so as to be smaller than the count of data elements of the training data.

Figure 9B:
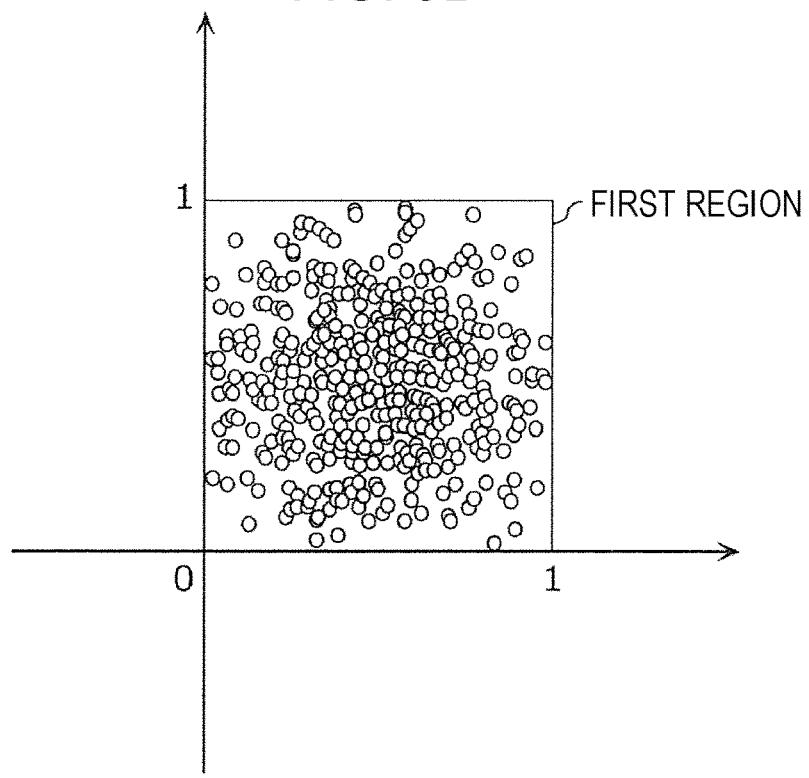
FIG. 9B is a diagram illustrating an example of training data distributed in M-dimensional space, after normalization.

Next, the learning unit 120 normalizes the training data (step S83). FIG. 9B illustrates an example of training data after normalization to be distributed in the two-dimensional space. In this example, the distribution range of training data that had been distributed such as illustrated in FIG. 9A before normalization is converted so as to cover the region of [0, 1]2 in the two-dimensional space. This sort of region is an example of a first region in the present embodiment.

Figure 9C:
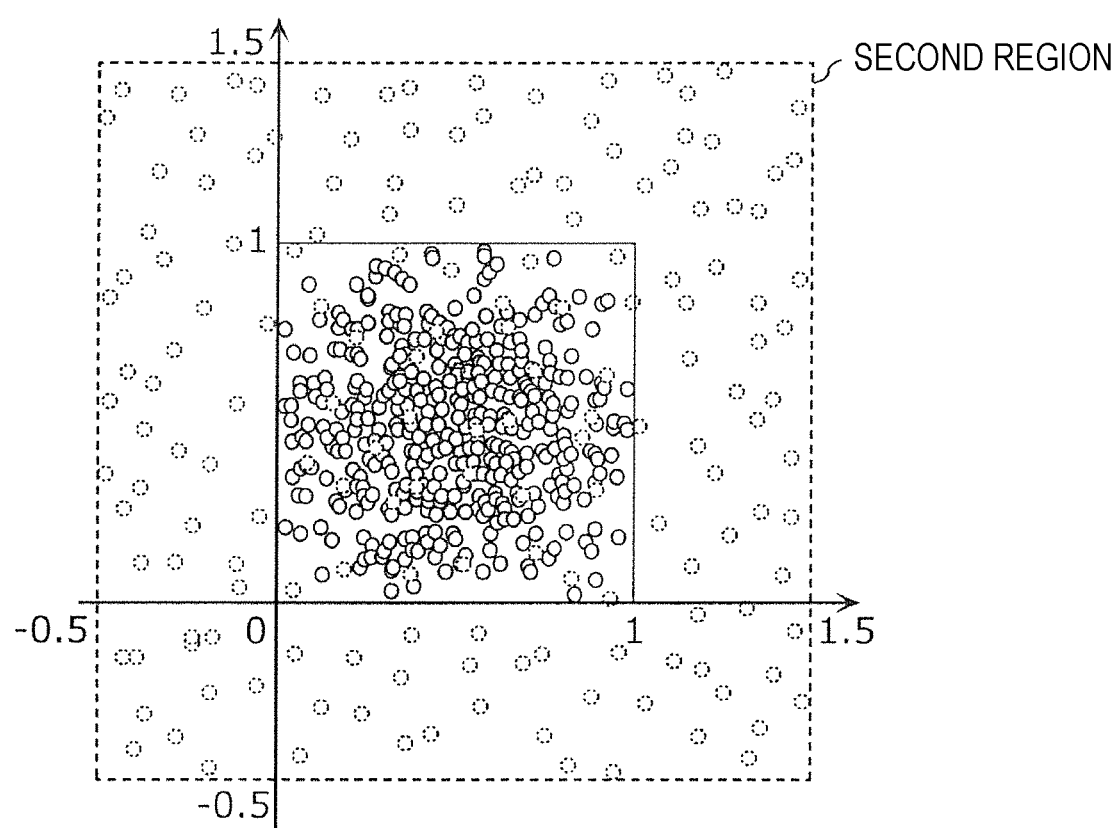
FIG. 9C is a diagram illustrating an example of training data distributed in M-dimensional space, after addition of a noise element.

The learning unit 120 then adds noise elements of the count decided in step S82 to an M-dimensional space larger than the first region and also encompassing the first region, i.e., within a region in the two-dimensional space in this example (step S84). FIG. 9C illustrates an example of training data after having added the noise elements distributed in the M-dimensional space with the noise elements being indicated by dotted-line circles distributed within the two-dimensional space. The noise elements are added to be distributed throughout [−0.5, 1.5]2 region in this example. Note that such a region is an example of a second region in the present embodiment.

As the result of the process in step S84, noise elements of a count smaller than the data elements of the original training data are added so as to be distributed over a wider region than the distribution range of the original training data, as illustrated in FIG. 9C. Accordingly, the distribution density of the noise elements is lower than the distribution density of the data elements of the original training data. In the above-described region, the noise elements are added with a uniform distribution as a whole.

The learning unit 120 then generates noise-added training data including the elements that are the M-dimensional vectors within the second region, i.e., both data elements and noise elements of training data that are both two-dimensional vectors (step S85).

Finally, the learning unit 120 generates an Isolation Forest learning model data using the noise-added training data generated in step S85 (step S86).

Note that of the above steps, step S82 and step S84 are examples of a second noise adding step, step S85 of a generating step, and step S86 of a learning model data output step in the present embodiment. That is to say, the learning unit 120 does not use the normalized training data as it is, as in conventional arrangements. Instead, the learning unit 120 generates a learning model using an arrangement where noise has been added to a region including around the distribution range of normalized training data in an M-dimensional space.

Generating a learning model using such noise-added training data enables a situation to be avoided where a learning model is obtained with a great number of normal data situated on the outer side of the boundary line such as illustrated in FIG. 7, even in a case where the count of anomalous data included in the training data is small. As a result, the anomaly detection system 100 can perform anomalous detection with suppressed false positive.

Note that although deciding the count of noise elements to be smaller than the count of data elements of the original training data was performed using a parameter assuming a real value larger than 0 and smaller than 1 in the above description regarding the first processing method, but the method of deciding the count of noise elements is not restricted to this. For example, the count of noise elements may be a counter here a certain number is subtracted from the count of data elements of the training data. The count of training data may be sectioned into multiple ranges, with a count of noise elements decoded beforehand being used for each range. The correlation between the count of training data and the count of noise elements may be included in a data table, for example, stored in memory in the information processing device.

Also, in the first processing method, an example of a case has been described where the data elements of the training data are two-dimensional vectors, but the idea based on the first processing method may be generalized and applied to space of higher dimensions, and the first processing method can be applied to training data that is three-dimensional or higher vectors. If the training data is M-dimensional vectors, the above-described range of the first region can be reread as [0, 1]M and applied, and the range of the second region as [−0.5, 1.5]M. That is to say, the first region is a region of M-dimensional space defined by a first hypercube that is a hypercube in M-dimensional space, and the second region is a region of M-dimensional space defined by a second hypercube that is a hypercube larger than and encompasses the first hypercube in M-dimensional space.

Second Processing Method

Figure 10:
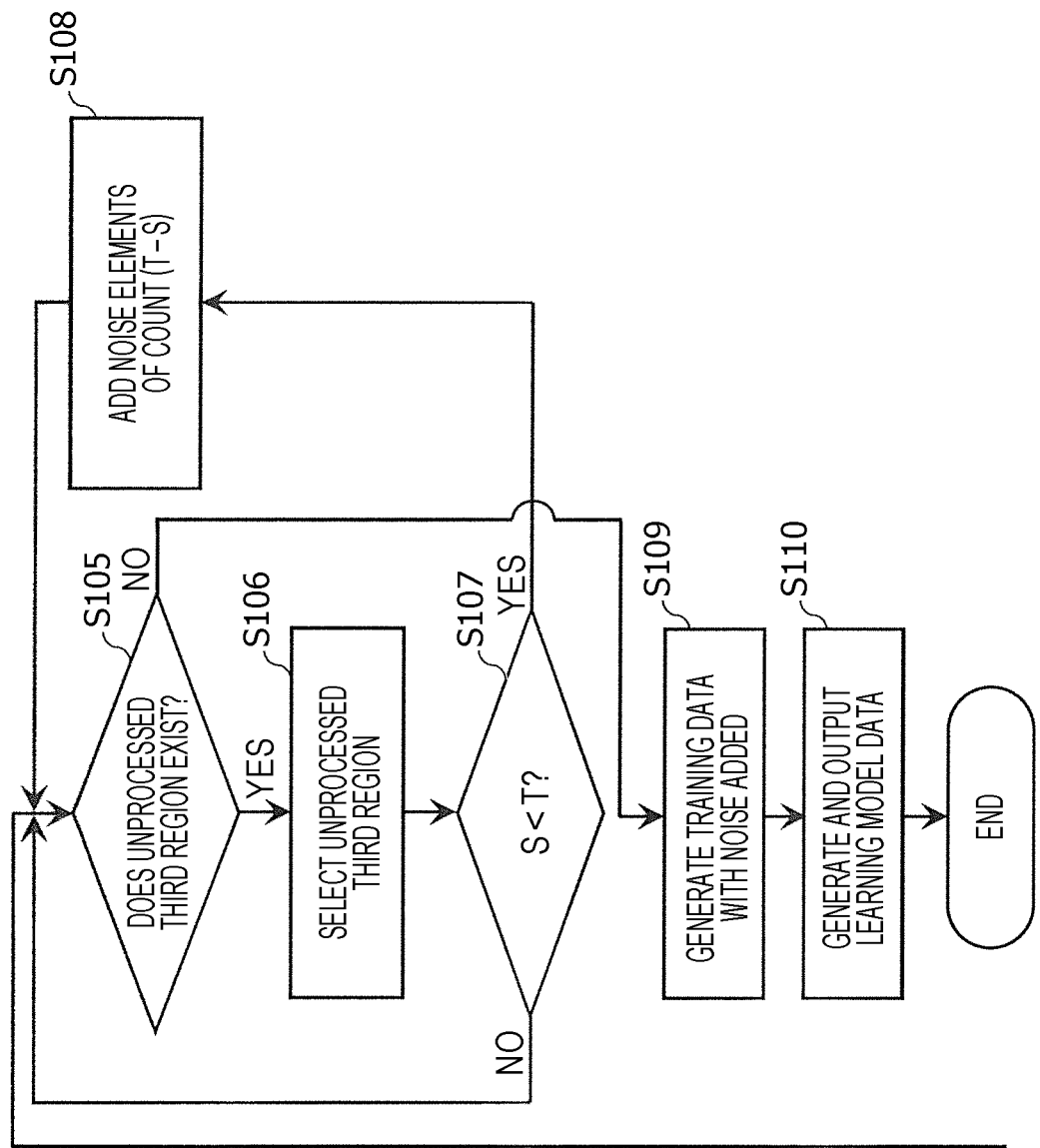
FIG. 10 is a flowchart illustrating another example of a training data processing method, executed in the anomaly detection system to obtain an appropriate learning model.
Figure 10:
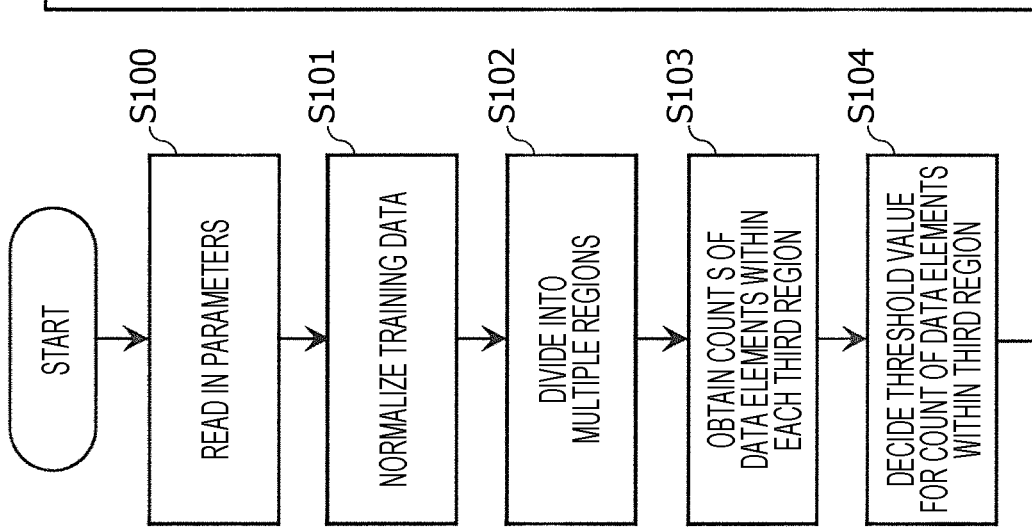

FIG. 10 is a flowchart illustrating a second processing method that is an example of another training data processing method for obtaining an appropriate learning model, described above. The second method also is executed by the learning model generating unit 124, in the learning unit 120 after having received input of Isolation Forest training data made up of two or more M-dimensional vectors. Note that in the following, processing by the learning model generating unit 124 may be described as processing of the learning unit 120. The second processing method will also be described with a case of starting from the initial state of training data in FIG. 9A. Description of processes that are the same as with the first processing method may be simplified.

First, the learning unit 120 reads in a parameter used for this processing (step S100). Details of the parameter will be described in a subsequent step.

Next, the learning unit 120 normalizes the input training data (step S101). The contents of the is process is the same as with the first processing method, and FIG. 9B illustrates an example of training data after normalization to be distributed in the two-dimensional space. In this example, the distribution range of training data that had been distributed such as illustrated in FIG. 9A before normalization is converted so as to cover the region of [0, 1]2 in the two-dimensional space. This sort of region is an example of a first region in the present embodiment.

Figure 11A:
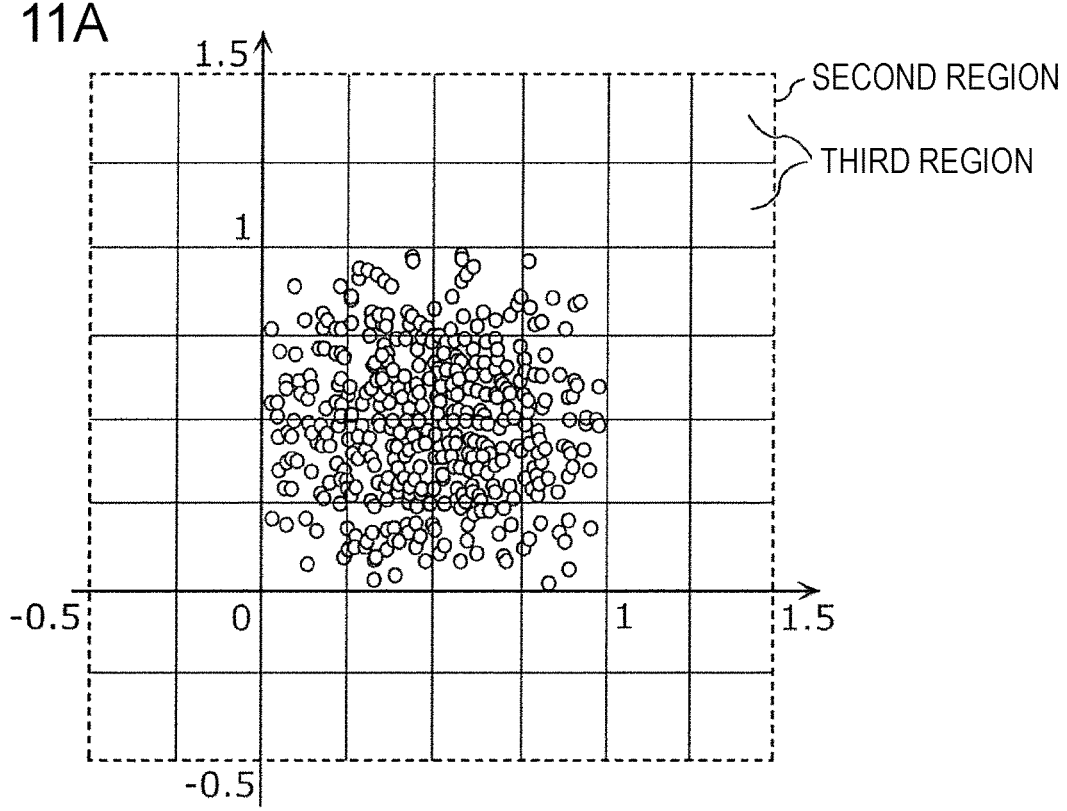
FIG. 11A is a diagram for describing an example of dividing an M-dimensional region in M-dimensional space.

Next, the learning unit 120 sets an M-dimensional space larger than the first region and also encompassing the first region, i.e., a second region that is a two-dimensional space region in this example, and divides the second region into third region that are M-dimensional hypercube of equal sizes (step S102). FIG. 11A is a diagram for describing the second region and third regions in the two-dimensional space. In the example illustrated in FIG. 11A, is a region [−0.5, 1.5]2, and the third region are sub-regions obtained by dividing the second region into 64.

Now, the parameter obtained in step S100 is used to decide the count of third regions obtained by dividing the second region in step S102. In the example in FIG. 11A the value of this parameter is 8 and the number of divisions is 8 to the M'th power, i.e., in this example is a squared number which is 64.

Next, the learning unit 120 obtains the count S (S is an integer equal to or greater than 0) of data elements of training data that each of the third regions includes (step S103). Note that at this point, no data elements of training data are within the third regions outside of the first region, so S=0 for each of the third regions.

Next, the learning unit 120 decides a first threshold value T (T is a natural number) that is a threshold value for the data elements of training data within each third region (step S104). The parameter obtained in step S100, for example, is used for deciding the first threshold value T. This may be the same as the parameter used in step S102, or may be different. If different, it may be calculated from the parameter used in step S102.

A more specific example of this parameter used in step S104 may be that identifying the count of data elements of training data included in the first region or any third region, for example. As a specific example, this may be that indicating a particular order when the counts of data elements of training data included in the third regions are arrayed in order of size. In this case, a count of data elements of training data included in a third region of a particular order is used for the first threshold value. As for the way of indicating the order, this may be the No. in order from the smallest value or the largest value, or may be the No. in the larger or smaller direction starting from an average value or median value.

From here on, the learning unit 120 executes procedures of judgment of whether or not addition of noise elements to each third region is necessary, and deciding the count of noise elements to be added to each third region, using the above-described S and T, and adding noise elements.

First, the learning unit 120 confirms whether or not there is a third region regarding which judgment relating to whether or not addition of noise elements is necessary (step S105), and if so (Yes in step S105), one of such third regions is selected (step S106), and judgment is made regarding whether or not the count S of data elements of training data in the third region is smaller than the first threshold value T (step S107).

In a case where the count S of data elements of training data in the third region is smaller than the first threshold value T (YES in S107), a count of (T−S) noise elements are added, so that the total count of data elements and noise elements in the third region is T (step S108).

In a case where the count S of data elements of training data in the third region is the first threshold value T or greater (NO in step S107), confirmation is further made regarding whether or not there further are unprocessed third regions (S105)

Figure 11B:
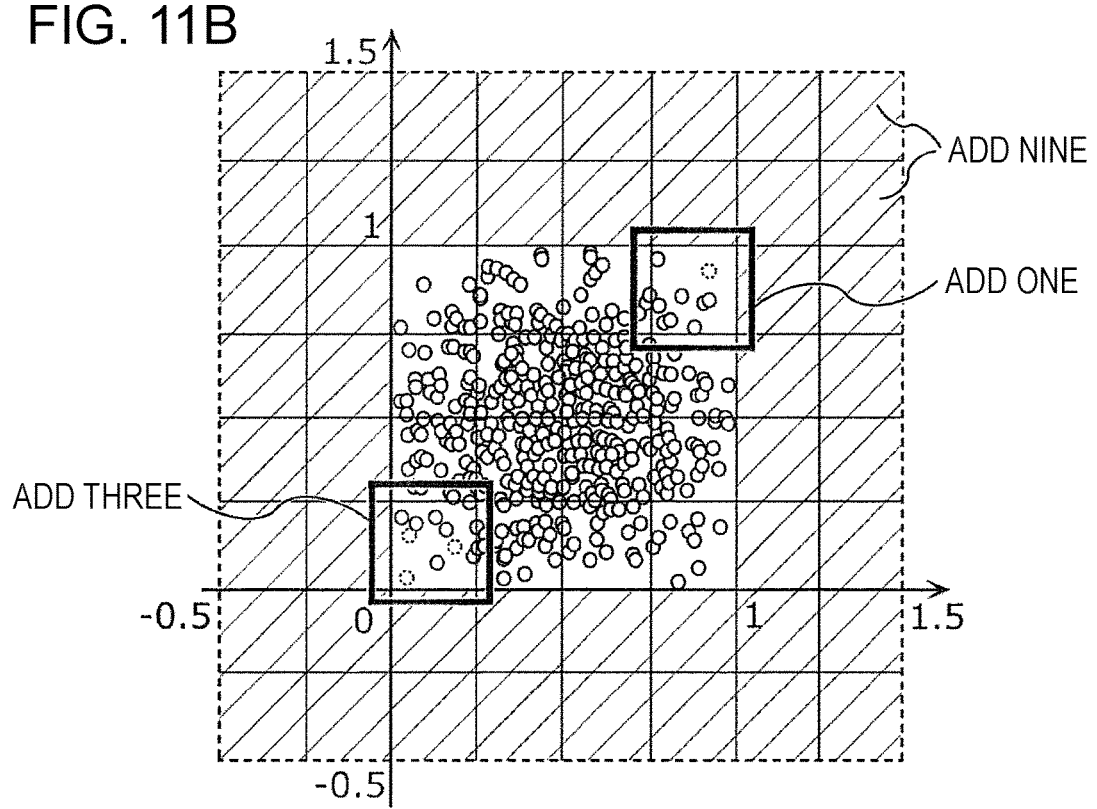
FIG. 11B is a diagram for describing an example of training data distributed in M-dimensional space, after addition of a noise element.

Upon processing of step S105 through step S107 or step S108 having been performed regarding all third regions (NO in step S105), the learning unit 120 generates noise-added training data including the data elements and noise elements within the second region (step S109). FIG. 11B is a diagram for describing an example of training data and noise elements distributed in tow-dimensional space in a case of NO in step S105. Noise elements are indicated by dotted line circles in FIG. 11B as well.

The example in FIG. 11B is an example of a case where the first threshold value T=9. The third region at the lower left corner of the first region has a count S=6 of data elements of training data, so a count of T−S=3 noise elements are added. The third region at the upper right corner of the first region has a count S=8 of data elements of training data, so a count of T−S=1 noise element is added. Other third regions within the first regions all have an S of 9 or more, so no noise elements are not added. The other third regions that are hatched are outside of the first region and do not include data elements for training data, so nine noise elements are added each. Noise elements in each third region are random numbers following a uniform distribution within that region.

Finally, the learning unit 120 generates an Isolation Forest learning model data using the noise-added training data generated in step S109, and outputs this learning model data (step S110).

Note that in the above-described steps, step S101 is an example of a normalization step, step S102 of a dividing step, steps S103 through S108 of a first noise adding step, step S109 of a generating step, and step S110 of a learning model data output step according to the present embodiment.

In the second processing method as well, the learning unit 120 does not use the normalized training data as it is, as in conventional arrangements. Instead, the learning unit 120 generates a learning model using an arrangement where noise has been added to a region including around the distribution range of normalized training data in an M-dimensional space.

Generating a learning model using such noise-added training data enables a situation to be avoided where a learning model is obtained with a great number of normal data situated on the outer side of the determination boundary line such as illustrated in FIG. 7, even in a case where the count of anomalous data included in the training data is small. As a result, the anomaly detection system 100 can perform anomalous detection with suppressed false positive.

Unlike the first processing method, in the second processing method the count of noise elements added within the first region where the training data is distributed is decided in accordance with the density for each region further subdivided. Accordingly, occurrence of locations where data elements and noise elements are excessively dense, which can occur in the first region in the first processing method, can be suppressed in the second processing method. In Isolation Forest, portions where vector data is dense in the training data readily falls in the inner side of the determination boundary. Accordingly, when excessive density of data elements and noise elements readily occurs, there is a higher probability of erroneous detection where anomalous data is determined to be normal. Erroneous detection due to erroneous determination where anomalous data is determined to be normal is also referred to as detection failure. The anomaly detection system 100 where anomaly determination of unknown data performed based on a learning model generated by executing the second processing method can carry out anomaly detection with suppressed occurrence of false positive and also suppress probability of detection failure.

In the same way as with the first processing method, in the second processing method as well, the idea on which this processing method is based may be generalized and applied to space of higher dimensions, and the second processing method can be applied to training data that is three-dimensional or higher vectors. If the training data is M-dimensional vectors, the above-described range of the first region can be reread as [0, 1]M and applied, and the range of the second region as [−0.5, 1.5]M. That is to say, the first region is a region of M-dimensional space defined by a first hypercube that is a hypercube in M-dimensional space, and the second region is a region of M-dimensional space defined by a second hypercube that is a hypercube larger than and encompasses the first hypercube in M-dimensional space.

Effects

Figure 12A:
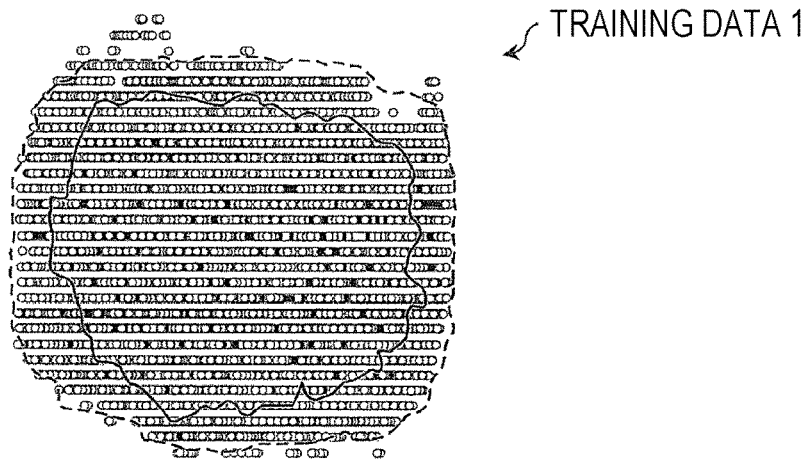
FIG. 12A is a diagram illustrating a determination boundary line of a learning model generated using training data without addition of noise, and a determination boundary line of a learning model generated using the same training data with addition of noise.
Figure 12B:
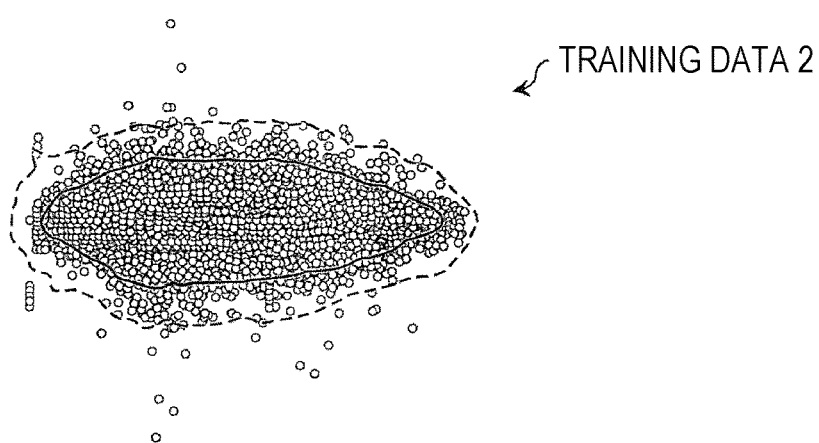
FIG. 12B is a diagram illustrating a determination boundary line of a learning model generated using training data without addition of noise, and a determination boundary line of a learning model generated using the same training data with addition of noise.

Now, the effects of adding noise to training data by the above-described second processing method will be demonstrated by an actual example. FIGS. 12A and 12B are diagram illustrating the determination boundary of a learning model generated using training data without adding noise thereto, and the determination boundary of a learning model generated using the same training data with noise added thereto by the above-described processing method. Note that training data 1 in FIG. 12A and training data 2 in FIG. 12B are different types of data obtained from an in-vehicle network of the same actual vehicle. Comparing training data 1 with training data 2, training data 1 has data elements distributed generally uniformly from the center of the distribution to the perimeter, while training data 2 has a distribution of data elements that becomes sparse near the perimeter. It can be said that training data 2 has a higher probability of including outliner values than training data 1.

In both FIGS. 12A and 12B, the circles represent data elements of training data. The solid line enclosures are the determination boundary of learning models generated using training data without noise added, and the dotted line enclosures are the determination boundary of learning models generated using training data with noise added. Noise elements are not illustrated in FIGS. 12A and 12B.

It can be seen from FIGS. 12A and 12B that all of the training data on the inner side of the determination boundaries of learning models generated using training data without noise added, and also much of the training data on the outer side thereof, is included on the inner side of the determination boundary of learning models generated using training data with noise added.

Figure 12C:
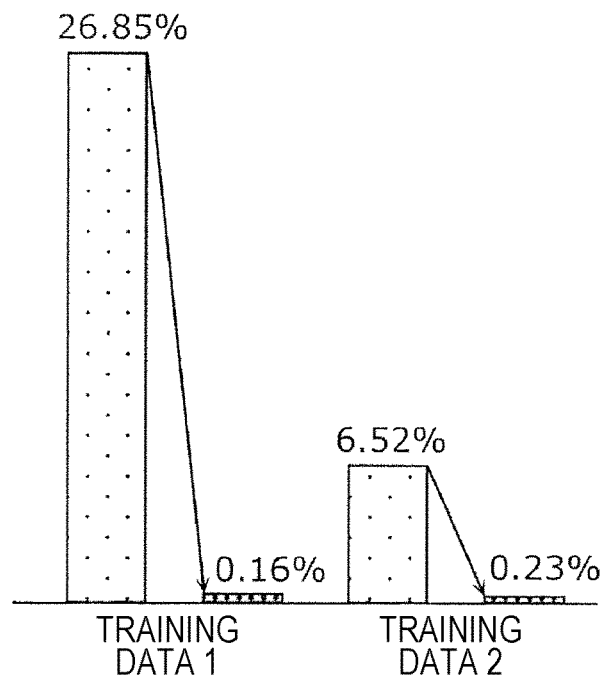
FIG. 12C is a bar graph illustrating erroneous detection rate in anomaly detection testing carried out using the learning models illustrating determination boundaries in FIGS. 12A and 12B.

Further, the present inventors carried out anomaly detection testing with each of the learning models using test data, to confirm whether the learning model obtained in a case of adding noise is more suitable. FIG. 12C illustrates the rate of erroneous detection in this anomaly detection test. In each training data, the bar to the left is the rate of erroneous detection for the learning model obtained without adding noise to the training data, and the bar to the right is the rate of erroneous detection for the learning model obtained with noise added to the training data.

It can be seen from FIG. 12C that the rate of erroneous detection is with the learning model obtained with noise added is markedly improved as compared with the learning model obtained without noise added. That is to say, it can be understood that the learning model obtained in a case of adding noise is more appropriate. This improvement can also be seen in the case of training data 2 that has a high probability of including outlier values, and had a somewhat low rate of erroneous detection even with the learning model obtained without adding noise. The importance of suppressing erroneous detection is important in anomaly detection in a vehicle traveling at several tens of kilometers per hour or faster, whether it be false positive or detection failure.

On the other hand, it is not necessarily easy to collect data having sufficient fluctuation, including anomaly data originating from an anomaly at the application layer for example, as training data obtained from a network conforming to a standard such as CAN or the like. The difficulty of preparing this is even more difficult for training data close to anomaly data occurring in an unknown attack pattern. That is to say, suppressing the rate of erroneous detection for anomaly detection has been difficult with conventional arrangements where such training data was used for generating a learning model by Isolation Forest.

However, by executing the processing method according to the present embodiment data elements that deviate from the training data by a certain level are added to the original training data including a great number of normal data elements, by an amount smaller than the original training data, and a lower density, in a data space. The data elements added here are called noise elements. The anomaly detection system using a learning model generated using this training data is capable of anomaly detection with suppressed rate of erroneous detection than conventional arrangements.

Second Embodiment

The first processing method and second first processing method described in the first embodiment are the difference in algorithms of programs executed at the information processing device to realize each, and can be selectively executed by switching programs to be read in at a certain processor, for example. However, there is the following difference between the first processing method and second processing method.

First, the second processing method is more dependent on the quantity of training data regarding the time required to add noise elements than the first processing method, and the more training data there is the more time is required. That is to say, the second processing method places a larger processing load on the processor. On the other hand, the accuracy of detection (how low the rate of erroneous detection is) of the generated learning model is improved with either as described above, but the second processing method is superior.

From the perspective of high accuracy, the second processing method is preferably executed in the anomaly detection system at all times. The above difference in processing load does not readily become a problem with the anomaly detection system 100A in FIG. 1A and the anomaly detection system 100B in FIG. 1B, since introducing sufficient calculator resources is easy. However, with the configuration of the anomaly detection system 100C in FIG. 1C, cases can be expected where there are restrictions in calculator resources, such as computation speed of the processor and so forth.

That is to say, there is a possibility that generating or updating the learning model at a necessary speed using the second processing method cannot be performed in a vehicle that is traveling.

Also, parameters in each of the processing methods affect the time cost and accuracy of detection in the anomaly detection system, not only the difference of processing methods. In the first processing method, the parameter used for deciding the count of noise elements can have a real number larger than 1 and smaller than 0 as a value. However, it is difficult to predict beforehand which values in this range generate a learning model more appropriate for anomaly detection, and in order to find this out, the accuracy is compared between anomaly detection performed on test data by multiple learning models generated by changing the parameter value, for example. Of course, comparison for finding such an optimal parameter uses more time until the learning model to be used for anomaly detection is decided. If deciding of the learning model is late, either anomaly detection cannot be executed until the learning model is decided, or anomaly detection is executed using an old learning model so accuracy is poor.

With the second processing method, there is a parameter used to decide the count of third regions obtained by dividing the second region, and a parameter used to decide the first threshold value T. Of these two parameters, with regard to the former, L can take a value of an integer of 4 or greater, assuming that a total of four or more third regions will be arrayed, from two or more by dividing once or more in the first region in each dimension, and one or more third regions on both sides outside of the first region. With regard to the latter, this can take a value of a real number that is 1 or greater and equal to or smaller than the count of third regions in the second region, if a value to be used for one of the third regions in the second region, for example. The same is also true regarding these parameters as the first processing method, in that searching gives a possibility of obtaining a learning model with higher accuracy in anomalous detection, but this requires more time unit the learning model to be used for anomaly detection is decided. Accordingly, either execution of anomaly detection is delayed, or accuracy is sacrificed.

The present Inventors have taken these points into consideration, a have conceived a technique where, in order to cause the anomaly detection system to execute anomaly detection at a necessary speed and with maximally high accuracy, the anomaly detection system is caused to perform speedy decision regarding selection of the processing method of training data and whether or not to execute a parameter search.

Such an anomaly detection system will be described below. The configuration of the anomaly detection system according to a second embodiment can be the same as in the first embodiment, so description of the anomaly detection system 100 will be omitted, and operations thereof will be described.

Operations

Figure 13:
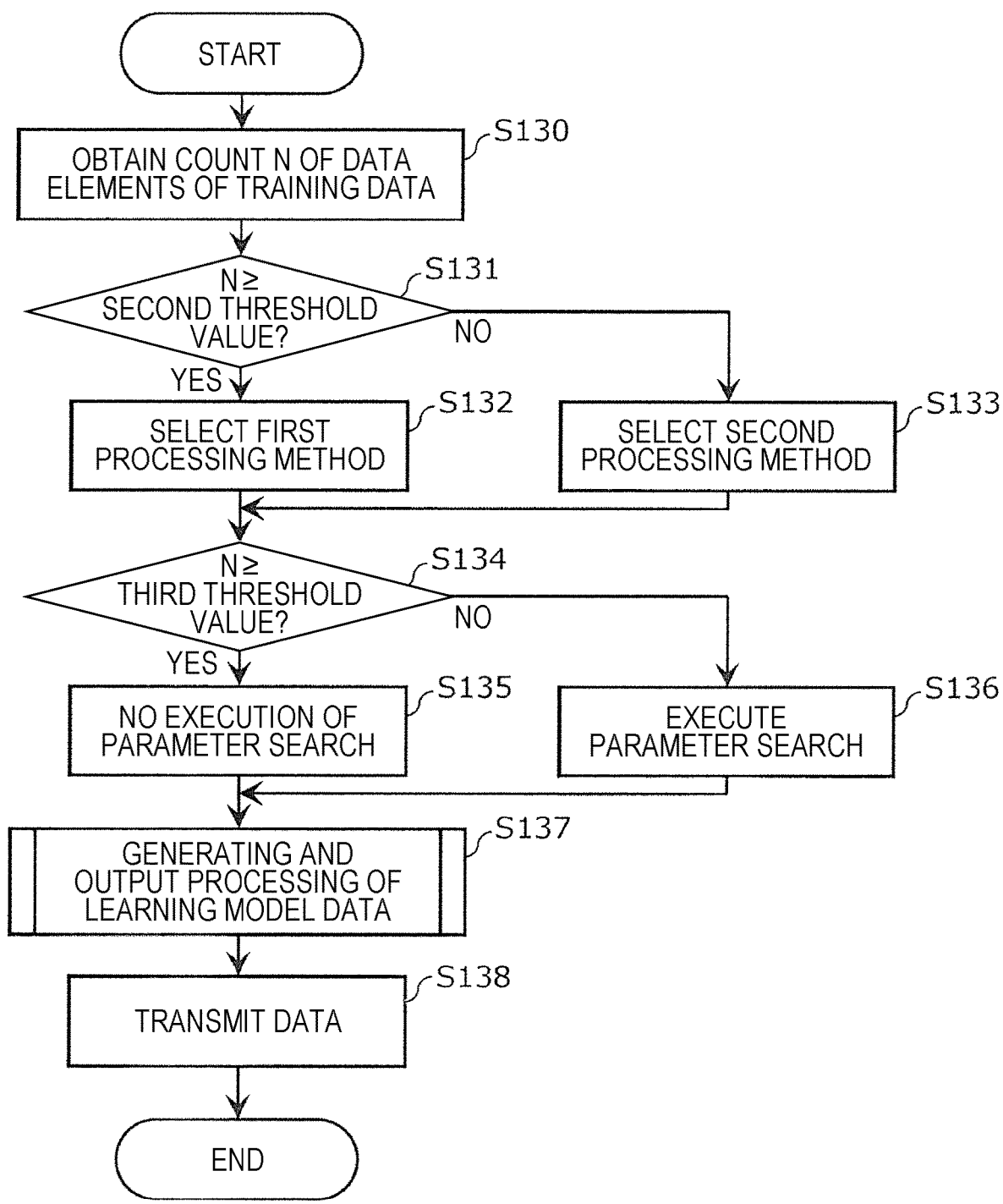
FIG. 13 is a flowchart illustrating an example of a processing method executed in an anomaly detection system according to a second embodiment, to select a processing method for training data, and decide whether or not to execute a parameter search in each processing method.

The overall processing for speedy decision regarding selection of the processing method of training data and whether or not to execute a parameter search at the anomaly detection system 100 will be described, and in this description the processing for parameter searching will be described. FIG. 13 is a flowchart illustrating an example of a processing method executed at the anomaly detection system 100 for deciding regarding selection of the processing method of training data and whether or not to execute a parameter search.

The processing method includes processes executed by the learning model generating unit 124 at the learning unit 120 after receiving input of Isolation Forest training data made up of two or more M-dimensional vectors. Note however, that even processing performed by the learning model generating unit 124 may be described as processing by the learning unit 120. Also included are process executed by the components of the anomaly determining unit 110, which may be described as processing by the anomaly determining unit 110 below. The following description assumes that in the initial state, the training data reception unit 122 has already received input of training data.

First, the learning unit 120 obtains a count N of data elements of training data (step S130).

Next, the learning unit 120 determines whether or not N is a predetermined second threshold value or greater (step S131). The second threshold value is a threshold value used for judging which of the first processing method and the second processing method to be used as the processing method for the training data, and is decided by usable calculator resources such as computation capabilities of a processor realizing the learning unit 120, for example, and is stored in memory of the information processing device. Using a predetermined threshold value in this way enable speedy judgment.

In a case of having determined that N is the second threshold value or greater, i.e., in a case where the count of data elements of the training data is great, the learning unit 120 selects the first processing method that enables completion in a shorter time (step S132).

In a case of having determined that N is not the second threshold value or greater, i.e., in a case where the count of data elements of the training data is small, the learning unit 120 selects the second processing method that yields a learning model capable of more highly accurate anomaly detection (step S133).

Next, the learning unit 120 determines whether N is a predetermined third threshold value or greater (step S134). The third threshold value is a threshold value used for judging whether or not to execute a parameter search when executing each of the processing methods for training data. In the same way as the second threshold value, the third threshold value is decided by usable calculator resources such as computation capabilities of a processor realizing the learning unit 120, for example, and is stored in memory of the information processing device. The third threshold value may be related to the second threshold value, or the two may be values independent from each other. Using a predetermined threshold value in this way enables speedy judgment.

In a case of having determined that N is the predetermined third threshold value or greater, i.e., in a case where the count of data elements of the training data is great, the learning unit 120 decides not to execute a parameter search, so as to complete in a shorter time (step S135).

In a case of having determined that N is not the predetermined third threshold value or greater, the count of data elements of the training data is small, so the learning unit 120 executes a parameter search to obtain a learning model that can perform anomaly detection with higher accuracy (step S136).

In a case of generating and outputting learning model data (step S137) via step S132 and step S135, the learning unit 120 executes the first processing method illustrated in the flowchart in FIG. 8.

In a case of generating and outputting learning model data (step S137) via step S133 and step S135, the learning unit 120 executes the second processing method illustrated in the flowchart in FIG. 10.

Figure 14:
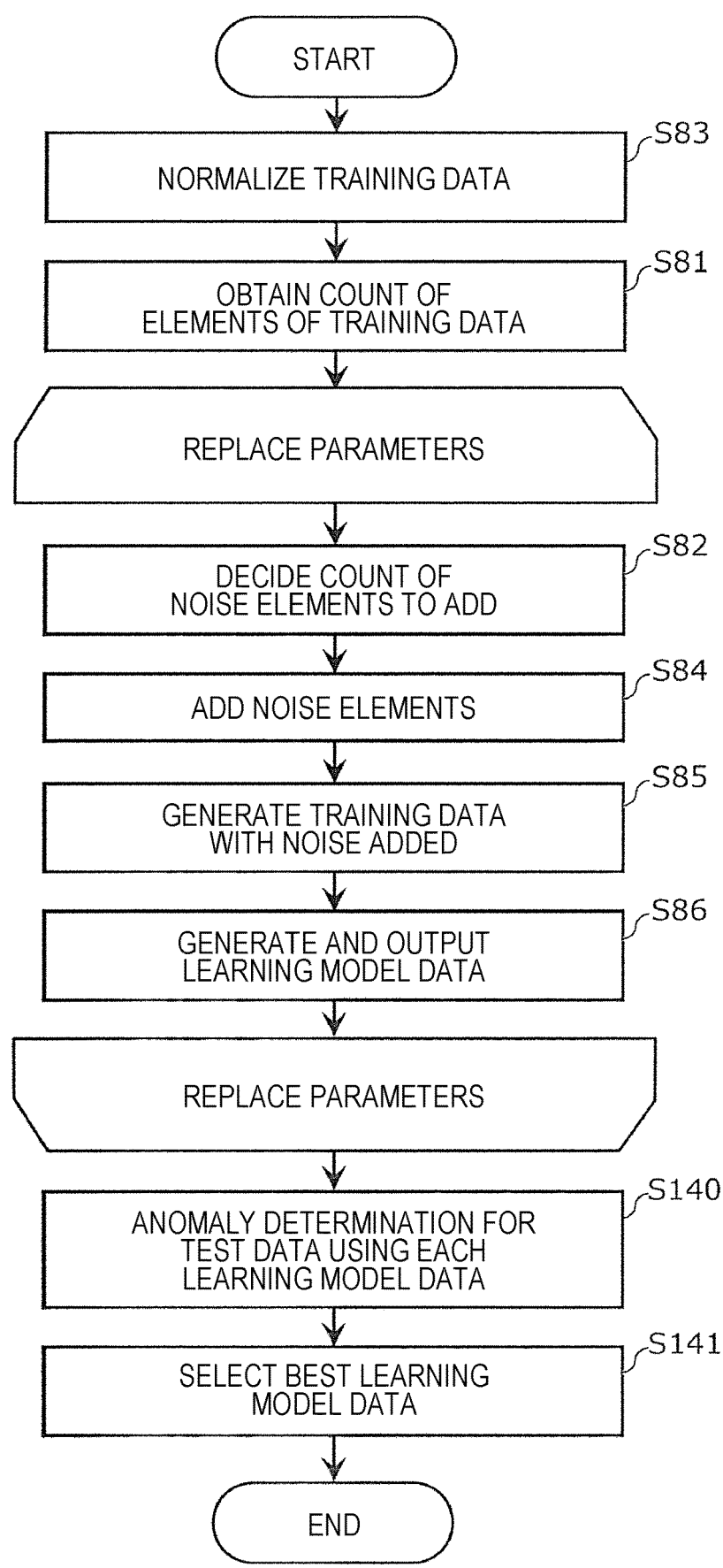
FIG. 14 is a flowchart illustrating an example of a processing method executed in an anomaly detection system according to the second embodiment, to obtain a more appropriate learning model.

In a case of generating and outputting learning model data (step S137) via step S132 and step S136, the learning unit 120 executes the first processing method illustrated in the flowchart in FIG. 14. FIG. 14 is a flowchart of the first processing method including a parameter search, that is executed at the anomaly detection system 100. Processes in the flowchart in FIG. 14 that are the same as those in the first processing method illustrated in the flowchart in FIG. 8 are illustrated by the same reference symbols, and detailed description will be omitted.

In the first processing method illustrated in the flowchart in FIG. 14, the learning unit 120 performs a set of the processes of S82 and S84 through S86 multiple times, while changing the parameter value. Multiple learning model data generated and output as a result thereof are saved in the accumulation unit 112 of the anomaly determining unit 110. Data used for normalization in step S83 is also provided to the anomaly determining unit 110 from the learning unit 120 and saved in the accumulation unit 112.

The anomaly determining unit 110 has obtained the Isolation Forest test data. This test data is, for example, input to the anomaly determining unit 110, saved in the accumulation unit 112, and in a case where determination is made in step S131 that N is not the second threshold value or greater, the anomaly determining unit 110 reads out and obtains this test data from the accumulation unit 112. The anomaly determining unit 110 then normalizes the test data using the data used in step S83 for normalization, and executes anomaly detection on the test data using each learning model data (step S140).

Finally, the learning unit 120 evaluates the anomaly determination using each learning model data made in step S140, and selects the best learning model data based on these evaluation results as the learning model data to be used for actual anomaly detection (step S141). Known evaluation criteria, such as recall, f-score, and so forth, for example, can be used for this evaluation. Note that step S141 may be carried out by the anomaly determining unit 110 instead.

Note that in the above-described steps, step S82 and step S84 are an example of a second noise adding step, step S85 of a generating step, and step S86 of a learning model data output step in the present embodiment. Also, step S131 is an example of a first determining step, and step S134 of a second determining step in the present embodiment. Also, step S140 and S141 are an example of a test data obtaining step, evaluating step, and learning model data selecting step according to the present embodiment.

One difference of a case where the first processing method is executed via step S132 and step S135 is a point regarding whether the set of the processes of step S82 and S84 through S86 is executed only one time or executed multiple times until the learning model data used for anomaly detection is output. Another point of difference is that multiple learning model data are evaluated using test data, and the best learning model data based on these evaluation results is selected as the learning model data to be used for anomaly detection.

Figure 15:
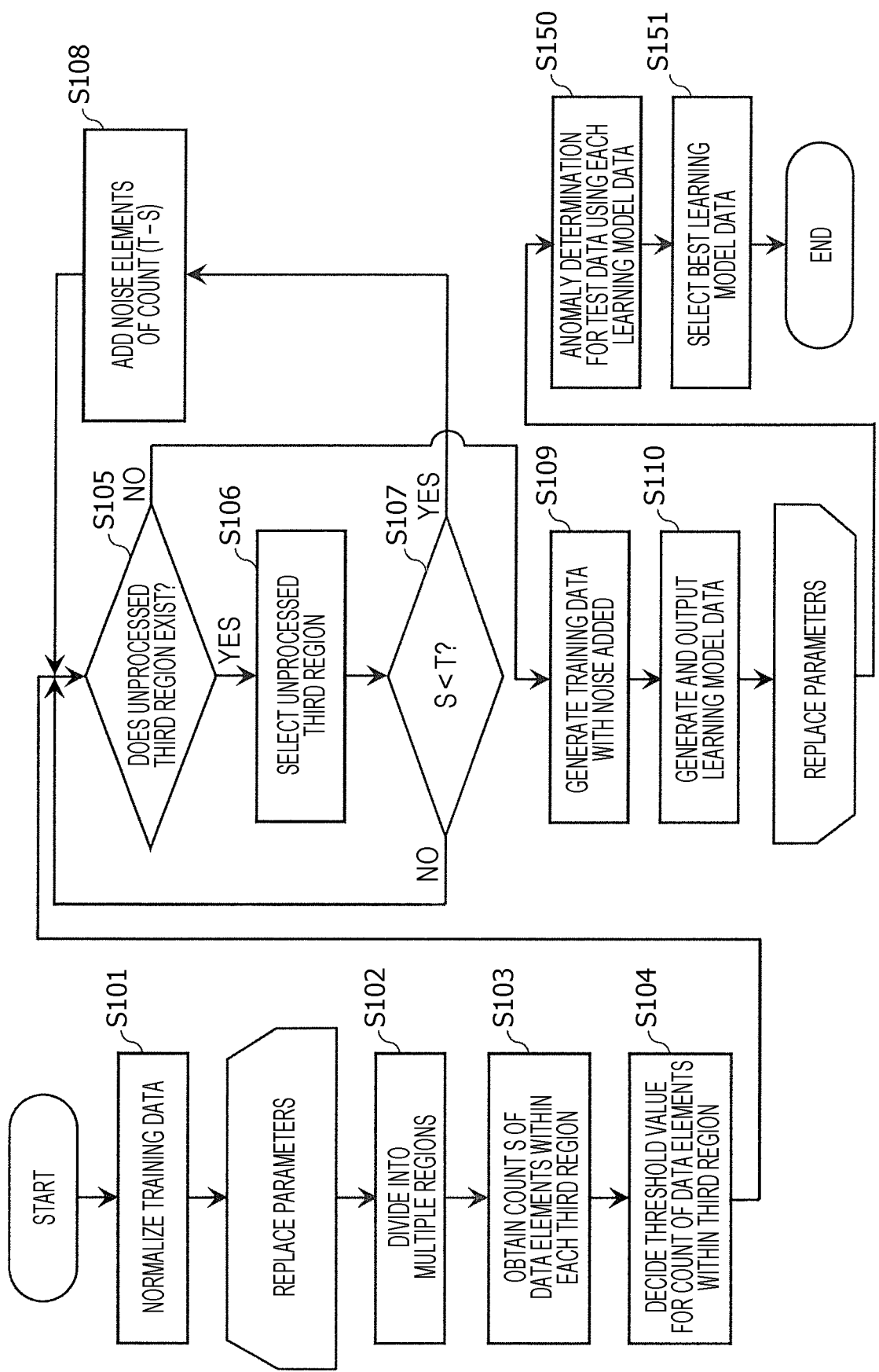
FIG. 15 is a flowchart illustrating another example of a processing method executed in an anomaly detection system according to the second embodiment, to obtain a more appropriate learning model.

In a case of generating and outputting learning model data (step S137) via step S133 and step S136, the learning unit 120 executes the second processing method illustrated in the flowchart in FIG. 15. FIG. 15 is a flowchart of the second processing method executed at the anomaly detection system 100, including a parameter search. Processes in the flowchart in FIG. 15 that are the same as those in the second processing method illustrated in the flowchart in FIG. 10 are illustrated by the same reference symbols, and detailed description will be omitted.

In the second processing method illustrated in the flowchart in FIG. 15, the learning unit 120 performs a set of the processes of step S102 through S110 multiple times, while changing combinations of values of two types of parameters. The multiple learning model data generated and output as a result thereof are saved in the accumulation unit 112 of the anomaly determining unit 110. Data used for normalization in step S101 is also provided form the learning unit 120 to the anomaly determining unit 110 and saved in the accumulation unit 112.

The contents of step S150 and S151 are the same as step S140 and S141, respectively.

Note that in the above-described steps, step S102 is an example of a dividing step, step S103 through S108 of a first noise adding step, step S109 of a generating step, and step S110 of a learning model data output step in the present embodiment. Also, step S131 is an example of a first determining step, and step S134 is an example of a second determining step in the present embodiment. Also, step S150 and S151 are an example of a test data obtaining step, evaluating step, and learning model data selecting step in the present embodiment.

One difference of a case where the second processing method is executed via step S133 and step S135 is a point regarding whether the set of the processes of step S102 through S110 is executed only one time or executed multiple times until the learning model data used for anomaly detection is output. Another point of difference is that multiple learning model data are evaluated using test data, and the best learning model data based on these evaluation results is selected as the learning model data to be used for anomaly detection.

As described above, in the flowchart illustrated in FIG. 13, there are two processing methods for noise addition, and there are two ways regarding each processing method, which is whether or not to execute a parameter search. That is to say, there are four processing patterns until the learning model data to be used for anomaly detection is decided and anomaly detection can be executed. Of these processing patterns, the one with the largest time cost is the pattern where the second processing method is executed including a parameter search. The one with the next largest time cost is the pattern where the first processing method is executed including a parameter search. In comparison with these two patterns, the time cost of the remaining two patterns is markedly small. Although it is described above that the second threshold value and third threshold value may be independent values, but may be decided taking into consideration the relation in magnitude of these time costs.

Also, the threshold value used in step S134 may be switched in accordance with the results of judgment in step S131, i.e., in accordance with whether the first processing method or the second processing method is used for adding noise. For example, an arrangement may be made where, in a case where the second processing method is used, the third threshold value is used, and in a case where the first processing method is used, a fourth threshold value that is a different predetermined value may be used instead of the third threshold value. The step S134 in a case where the fourth threshold value is used in this way is an example of the third determining step in the present embodiment.

Also, in the flowchart in FIG. 13, two judgements are made, which are judgment of the processing method for noise addition, and judgement of whether or not to execute a parameter search for each processing method, but both of these are not imperative for adjusting time cost. An arrangement may be made where time cost adjustment is made by only one of these judgements.

Although the only options prepared regarding execution of a parameter search is to execute or not in the flowchart in FIG. 13, but the count of parameters to change for searching may be differentiated in stages in accordance with the count of data elements of training data, for example. That is to say, the greater the count of data elements of training data is, the more the count of parameters to be changed may be reduced. In this case, the count of parameters may be a value calculated from the count of data elements, or may be a value decided beforehand for each predetermined range of data elements. That is to say, it is sufficient for there to be a negative correlation between the count of data elements of training data and the count of parameters. Accordingly, when there are many data elements of the training data, increase in the load of computation processing can be suppressed so that the time necessary for deciding the learning model data does not become too long.

Also, although whether to execute the first processing method or to execute the second processing method for processing training data is selected in accordance with the results of comparing the count N of data elements of the training data with the second threshold value in the flowchart in FIG. 13, this is not restrictive. For example, there may be an option of not executing processing of training data. For example, such a judgment may be made in a case where the current learning model is to be continuously used for anomaly detection since the load on the processor is great due to other processing at the information processing device, and generating of a new learning model for updating is delayed. Also, the options may be two options of one of execution of the first processing method or execution of the second processing method, and not executing processing of training data.

Other Embodiments

The first and second embodiments have been described above as examples of technology relating to the present disclosure. However, technology relating to the present disclosure is not restricted to this, and is applicable to embodiments where modifications, substitutions, addition, omission, and so forth have been made as appropriate. For example, the following modifications are also included in an embodiment of the present disclosure.

Part or all of the components configuring the devices in the above-described embodiments may be configured as a single system Large Scale Integration (LSI). A system LSI is a super-multi-functional LSI manufactured integrating multiple components on a single chip, and specifically is a computer system configured including a microprocessor, read only memory (ROM), random access memory (RAM), and so forth. A computer program is recorded in the RAM. The system LSI realizes its functions by the microprocessor operating according to the computer program recorded in RAM. The parts of the components making up the above devices may be individually formed into one chip, or part or all may be included in one chip. While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. An FPGA (Field Programmable Gate Array) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

Note that in the above embodiments, the components may be configured of dedicated hardware, or may be realized by a software program appropriate for the components being executed. The components may be realized by a program executing unit such as a CPU or processor or the like reading out and executing a software program recorded in a recording medium such as a hard disk or semiconductor memory or the like. Software that realizes the information processing device and so forth according to the above embodiments is a program such as follows.

That is to say, this program causes a computer to execute an information processing method including a data element obtaining step of receiving input of an N count (where N is an integer of 2 or greater) of data elements that are M-dimensional vectors (where M is an integer of 2 or greater), to be used as training data for Isolation Forest, a normalization step of normalizing the training data so as to be distributed throughout an M-dimensional first region, a dividing step of dividing an M-dimensional second region that is larger than the first region and encompasses the first region into an $LM$ count (where L is an integer of 4 or greater) third regions that are M-dimensional hypercubes of equal sizes, a first noise adding step of obtaining a count S (where S is an integer of 0 or greater) data elements that each of the third regions contains, and with regard to each third region including data elements of a count smaller than a first threshold value T (where T is a natural number), a count of (T−S) noise elements that are M-dimensional vectors are added with a uniform distribution to the third regions, a generating step of generating noise-added training data including the data elements and noise elements, and a learning model data output step of generating and outputting Isolation Forest learning model data using the noise-added training data.

The present disclosure is realizable as the information processing device that generates learning model data using training data, and provides this learning model data to an anomaly determining device that executes anomaly determining, described in the above embodiments. The present disclosure also is realizable as an anomaly detection system having the information processing device and anomaly determining device. If within the anomaly detection system of the configuration illustrated in FIG. 1A or FIG. 1C for example, this anomaly determining device is a monitoring ECU that realizes the anomaly determining device connected to the in-vehicle network 210. If within the anomaly detection system illustrated in FIG. 1B, this is the external server 10 that realizes the anomaly determining device. In either case, the anomaly determining device has memory that stores the learning model data output from the information processing device, and a processor, and is connected to a network. This network typically is an in-vehicle CAN network as described above, but is not restricted to this.

For example, this may be a network such as CAN-FD (CAN with Flexible Data rate), FlexRay, Ethernet, LIN (Local Interconnect Network), MOST (Media Oriented Systems Transport), or the like. Alternatively, an in-vehicle network where these networks are sub-networks and combined with a CAN network.

The embodiments described above are applied to achieve high cyber security in the in-vehicle network installed in a vehicle. However, the applications are not limited to those examples. The embodiments may be applied to achieve high security not only in vehicles but also mobilities such as construction machines, farm machines, vessels, railways, airplanes, or the like. That is, the embodiments described above may be applied to achieve high cyber security in mobility networks and mobility network systems. Furthermore, the embodiments can also be applied to communication networks used in factories or industrial control systems or can be applied to communication networks for controlling embedded devices.

In the above embodiments, the components may be circuits. Multiple components may overall make up one circuit, or may make up individual circuits. The circuits may be general-purpose circuits, or may be dedicated circuits.

Although an embodiment has been described based on an information processing device according to one or multiple forms, the present disclosure is not restricted to this embodiment. Forms configured by making various types of modifications conceivable by one skilled in the art in the present embodiment, and those configured by combining components in different embodiments, without departing from the essence of the present disclosure, may also be included in the scope of one or multiple forms.

For example, in the above-described embodiment, processing executed by a particular component may be executed by a different component instead of the particular component. The order of multiple processes may be changed, and multiple processes may be executed in parallel.

The present disclosure is usable in an in-vehicle network system including an in-vehicle network.

What is claimed is:
1. An information processing device, comprising:
   a processor; and
   a memory that includes at least one set of instructions that, when executed by the processor, causes the processor to execute operations including:
      obtaining training data for an Isolation Forest algorithm, the training data including N data elements, N being an integer that is greater than or equal to two, and each of the N data elements being an M-dimensional vector, M being an integer that is greater than or equal to two,
      normalizing the training data so as to be distributed within an M-dimensional first region,
      dividing a second region into LM third regions of equal sizes, L being an integer that is greater than or equal to four, and the second region being an M-dimensional region that is larger than the first region and encompasses the first region, each of the LM third regions being an M-dimensional hypercube, obtaining S data elements included in each of the LM third regions, S being an integer that is greater than or equal to zero, adding, to each of one or more third regions from among the LM third regions within which a value of S is less than a first threshold value T, T being an integer that is greater than or equal to one, D first noise elements in a uniform distribution, D being equal to a difference between T and S, and each of the D first noise elements being an M-dimensional vector, generating noise-added training data that includes each of the N data elements and each of the D first noise elements, and generating and outputting Isolation Forest learning model data by using the noise-added training data.

2. The information processing device according to claim 1, wherein the operations further include:
determining whether or not N is greater than or equal to a predetermined second threshold value, and
executing, when N is determined not to be greater than or equal to the predetermined second threshold value, the dividing and the adding, and thereafter executing the generating the noise-added training data and the generating and outputting the Isolation Forest learning model data.

3. The information processing device according to claim 2, wherein the operations further include:
adding, when N is determined to be greater than or equal to the predetermined second threshold value, K second noise elements with a uniform distribution within the second region, K being a natural number that is greater than or equal to zero and less than N, each of the K second noise elements being an M-dimensional vector,
and wherein the generating and outputting the Isolation Forest learning model data is executed after executing the adding of the K second noise elements.

4. The information processing device according to claim 2, wherein the operations further include:
when N is determined not to be greater than or equal to the predetermined second threshold value,
obtaining data for testing for the Isolation Forest algorithm, and
determining whether or not N is greater than or equal to a predetermined third threshold value,
when N is determined not to be greater than or equal to the predetermined third threshold value,
executing a set of operations that includes the dividing, the adding, the generating the noise-added training data, and the generating the Isolation Forest learning model data, a plurality of times using L different values, and outputting a respective set of learning model data for each executed set of operations,
executing an anomaly detection operation on the data for testing using each respective set of learning model data,
evaluating each respective set of learning model data based on a result of the executing the anomaly detection operation,
selecting a best set of learning model data from among the sets of learning model data based on a result of the evaluating, and
and when N is determined to be greater than or equal to the predetermined third threshold value,
executing the set of operations one time in the dividing, using L of a predetermined value.

5. The information processing device according to claim 4, wherein the operations further include:
determining, when N is determined not to be greater than or equal to the predetermined third threshold value, a number of different values of L, so as to have a negative correlation with the value of N.

6. The information processing device according to claim 1, wherein the operations further include:
determining a value of the first threshold value T as being equal to any number that is less than a median value of numbers of data elements included in each of the third regions within the first region.

7. The information processing device according to claim 3, wherein the operations further include:
when N is determined to be greater than or equal to the predetermined second threshold value,
obtaining data for testing for the Isolation Forest algorithm, and
determining whether or not N is greater than or equal to a predetermined fourth threshold value,
when N is determined not to be greater than or equal to the predetermined fourth threshold value,
executing a set of operations that includes the adding the K second noise elements, the generating the noise-added training data, and the generating the Isolation Forest learning model data, a plurality of times using K different values, and outputting a respective set of learning model data for each executed set of operations,
executing an anomaly detection operation on the data for testing using each respective set of learning model data,
evaluating each respective set of learning model data, and
selecting a best set of learning model data from among the sets of learning model data based on a result of the evaluating,
and when N is determined to be greater than or equal to the predetermined fourth threshold value,
executing the set of operations one time using K of a predetermined value.

8. The information processing device according to claim 7, wherein the operations further include:
determining, when N is determined not to be greater than or equal to the predetermined fourth threshold value, a number of different values of K, so as to have a negative correlation with the value of N.

9. The information processing device according to claim 1, wherein, the first region being defined by a hypercube of $[0, 1]M$ in an M-dimensional space,
the second region is a region defined by a hypercube of $[-0.5, 1.5]M$ in the space.

10. An anomaly detection system comprising:
an information processing device connected to a network; and
an anomaly detection device connected to the network,
wherein the information processing device includes:
a first processor; and a first memory that includes at least one set of instructions that, when executed by the first processor, causes the first processor to execute first operations including:
    obtaining training data for an Isolation Forest algorithm, the training data including N data elements, N being an integer that is greater than or equal to two, and each of the N data elements being an M-dimensional vector, M being an integer that is greater than or equal to two,
    normalizing the training data so as to be distributed within an M-dimensional first region,
    dividing a second region into LM third regions of equal sizes, L being an integer that is greater than or equal to four, and the second region being an M-dimensional region that is larger than the first region and encompasses the first region, each of the LM third regions being an M-dimensional hypercube,
    obtaining S data elements included in each of the LM third regions, S being an integer that is greater than or equal to zero,
    adding, to each of one or more third regions from among the LM third regions within which a value of S is less than a first threshold value T, T being an integer that is greater than or equal to one, D first noise elements in a uniform distribution, D being equal to a difference between T and S, and each of the D first noise elements being an M-dimensional vector,
    generating noise-added training data that includes each of the N data elements and the each of the D first noise elements, and
    generating and outputting Isolation Forest learning model data by using the noise-added training data,
the anomaly detection device including:
    a second processor,
    a second memory that stores the learning model data output from the information processing device, and
    a third memory that includes at least one set of second instructions that, when executed by the second processor, causes the second processor to execute second operations including:
        obtaining data that flows through the network, and
        executing an anomaly detection operation of the obtained data based on the learning model data stored in the second memory.

11. The anomaly detection system according to claim 10, wherein the network is an in-vehicle Controlled Area Network.

12. An information processing method for an information processing device having a processor, the method comprising:
    obtaining training data for an Isolation Forest algorithm, the training data including N data elements, N being an integer that is greater than or equal to two, and each of the N data elements being an M-dimensional vector, M being an integer that is greater than or equal to two;
    normalizing the training data so as to be distributed within an M-dimensional first region;
    dividing a second region into LM third regions of equal sizes, L being an integer that is greater than or equal to four, and the second region being an M-dimensional region that is larger than the first region and encompasses the first region, each of the LM third regions being an M-dimensional hypercube;
    obtaining S data elements included in each of the LM third regions, S being an integer that is greater than or equal to zero;
    adding, to each of one or more third regions from among the LM third regions within which a value of S is less than a first threshold value T, T being an integer that is greater than or equal to one, D first noise elements in a uniform distribution, D being equal to a difference between T and S, and each of the D first noise elements being an M-dimensional vector;
    generating noise-added training data that includes each of the N data elements and each of the D first noise elements; and
    generating and outputting Isolation Forest learning model data by using the noise-added training data.

13. A computer-readable non-transitory recording medium storing a program for an information processing device having a processor,
    wherein, when executed by the processor, the program causes the processor to implement a method including:
        obtaining training data for an Isolation Forest algorithm, the training data including N data elements, N being an integer that is greater than or equal to two, and each of the N data elements being an M-dimensional vector, M being an integer that is greater than or equal to two,
        normalizing the training data so as to be distributed within an M-dimensional first region,
        dividing a second region into LM third regions of equal sizes, L being an integer that is greater than or equal to four, and the second region being an M-dimensional region that is larger than the first region and encompasses the first region, each of the LM third regions being an M-dimensional hypercube,
        obtaining S data elements included in each of the LM third regions, S being an integer that is greater than or equal to zero,
        adding, to each of one or more third regions from among the LM third regions within which a value of S is less than a first threshold value T, T being an integer that is greater than or equal to one, D first noise elements in a uniform distribution, D being equal to a difference between T and S, and each of the D first noise elements being an M-dimensional vector,
        generating noise-added training data that includes each of the N data elements and each of the D first noise elements, and
        generating and outputting Isolation Forest learning model data by using the noise-added training data.

* * * * *